US012669669B2

(12) United States Patent
Liu et al.

(10) Patent No.: US 12,669,669 B2
(45) Date of Patent: Jun. 30, 2026

(54) FIBER OPTIC CLOSURE ASSEMBLIES, FIBER DROP ACCESS POINTS, AND METHODS FOR INSTALLING FIBER DROP ACCESS POINTS

(71) Applicant: CORNING RESEARCH & DEVELOPMENT CORPORATION, Corning, NY (US)

(72) Inventors: Dani Liu, Corning, NY (US); Zachary Michael Thompson, Austin, TX (US)

(73) Assignee: CORNING RESEARCH & DEVELOPMENT CORPORATION, Corning, NY (US)

( * ) Notice: Subject to any disclaimer, the term of this patent is extended or adjusted under 35 U.S.C. 154(b) by 227 days.

(21) Appl. No.: 18/374,372

(22) Filed: Sep. 28, 2023

(65) Prior Publication Data

US 2024/0027720 A1 Jan. 25, 2024

Related U.S. Application Data

(63) Continuation of application No. PCT/US2022/022300, filed on Mar. 29, 2022.
(Continued)

(51) Int. Cl.
| | |
|---|---|
| *G02B 6/00* | (2006.01) |
| *G02B 6/44* | (2006.01) |
| *G02B 6/50* | (2006.01) |

(52) U.S. Cl.
CPC ..... *G02B 6/44465* (2023.05); *G02B 6/44515* (2023.05); *G02B 6/44528* (2023.05); *G02B 6/501* (2023.05)

(58) Field of Classification Search
CPC ............ G02B 6/44465; G02B 6/44515; G02B 6/44528; G02B 6/501; G02B 6/4457; G02B 6/504; G02B 6/00
See application file for complete search history.

(56) References Cited

U.S. PATENT DOCUMENTS

| | | | |
|---|---|---|---|
| 2,420,768 A | 5/1947 | Beveridge, Jr. | |
| 2,505,637 A | 4/1950 | Chase | |

(Continued)

FOREIGN PATENT DOCUMENTS

| | | |
|---|---|---|
| DE | 102016008729 B4 | 5/2019 |

OTHER PUBLICATIONS

International Search Report and Written Opinion of the International Searching Authority; PCT/US2022/022300; mailed on Jun. 29, 2022, 14 pages; European Patent Office.
(Continued)

*Primary Examiner* — Jennifer Doan
(74) *Attorney, Agent, or Firm* — Tamika A. Crawl-Bey

(57) ABSTRACT

A fiber enclosure includes an upper body portion and a lower body portion coupled to the upper body portion. The upper body portion defines a primary volume. The lower body portion extends from the upper body portion and defines an inlet volume in communication with the primary volume, the lower body portion comprising a port wall comprising a plurality of ports for receiving cables. The port wall is recessed from an outer edge of the upper body portion, such that the plurality of ports is positioned in a separate plane from the upper body portion and recessed from the outer edge of the upper body portion a distance larger than or equal to a bend radius of a cable connected thereto.

18 Claims, 20 Drawing Sheets

Related U.S. Application Data

(60) Provisional application No. 63/169,136, filed on Mar. 31, 2021.

(56) References Cited

U.S. PATENT DOCUMENTS

| | | | |
|---|---|---|---|
| 5,133,038 A | 7/1992 | Zipper | |
| D387,734 S | 12/1997 | Hawkins et al. | |
| 6,434,313 B1 | 8/2002 | Clapp et al. | |
| 7,349,616 B1 * | 3/2008 | Castonguay ....... | G02B 6/44524 |
| | | | 398/67 |
| 8,005,333 B2 | 8/2011 | Mullaney et al. | |
| D834,475 S | 11/2018 | Rode et al. | |
| 10,367,344 B2 | 7/2019 | Smith | |
| 10,732,368 B1 * | 8/2020 | Ray ........................ | G02B 6/445 |
| D897,282 S | 9/2020 | Ye et al. | |
| D924,952 S | 7/2021 | Boulay et al. | |
| D929,477 S | 8/2021 | Boulay et al. | |
| D976,837 S | 1/2023 | Komoto | |
| D993,954 S | 8/2023 | Chen | |
| 2009/0290844 A1 | 11/2009 | Mullaney et al. | |
| 2011/0097050 A1 | 4/2011 | Blackwell, Jr. et al. | |
| 2019/0064463 A1 | 2/2019 | Bandy et al. | |
| 2020/0319420 A1 | 10/2020 | Cams et al. | |

OTHER PUBLICATIONS

Small Joint Closure (SJC), Prysmian Group, OP063, Issue 06, Apr. 2017, pp. 2.
Tyko Flex T240 Joint Closure, 2 pages.

* cited by examiner

FIBER OPTIC CLOSURE ASSEMBLIES, FIBER DROP ACCESS POINTS, AND METHODS FOR INSTALLING FIBER DROP ACCESS POINTS

CROSS-REFERENCE TO RELATED APPLICATION

This application is a continuation of International Patent Application No. PCT/US2022/022300 filed on Mar. 29, 2022, which claims the benefit of priority of U.S. Provisional Application Ser. No. 63/169,136, filed Mar. 31, 2021, the content of which is relied upon and incorporated herein by reference in its entirety.

BACKGROUND

The present specification generally relates to fiber optic closure assemblies, fiber drop access points, and methods for installing fiber drop access point.

Fiber optic cables are widely used for telecommunications applications where high information capacity, noise immunity and other advantages of optical fibers may be desirable. Fiber cable architectures are emerging for connecting homes and/or business establishments, via optical fibers, to a central location, for example. A trunk or main cable (also referred to herein as an "express fiber cable") may be routed, for example, through a housing subdivision, business district, etc., and small fiber count "drop cables" may be spliced to the main cable at predetermined spaced apart locations to allow connectivity.

A typical main cable may be installed underground and have multiple drop cables connected thereto. Each of the drop cables, in turn, may be routed to an optical network unit (ONU), which may serve one or more locations (e.g., homes, business, etc.) or directly to one or more locations (e.g., homes, businesses, etc.).

Drop cable installation may occur at a fiber drop access point. The fiber drop access point may generally include a vault located underground in which spliced connections between the main cable and drop cables are made. Currently, large vaults, sometimes many times larger than the fiber enclosure must be excavated to maintain not just the fiber enclosure but cable slack of the main fiber cable and/or the drop fiber cables. For example, typical vaults are commonly 24' (length) by 36' (width) by 18' (deep), which require considerable excavation of concrete (when positioned in a sidewalk) and soil. A separate metal or composite container may then be placed underground thereby providing the vault. Due to the extensive excavation, there is often a need to pour new sections of concrete around the vault after excavation and vault placement.

After vault placement, a fiber enclosure, which maintains spliced connections between the main cable and the drop cables in a sealed environment, and any cable slack may be positioned within the vault. Slack may be desirable to provide versatility or adaptability in providing more fiber drop access points, cable repairs, etc. to a network. However, the above processes may be very labor and cost intensive.

SUMMARY

Fiber enclosures, fiber drop access points, and methods for installing fiber drop access points having lower profiles and less excavation are disclosed herein.

In one embodiment, a fiber enclosure includes an upper body portion and a lower body portion coupled to the upper body portion. The upper body portion defines a primary volume. The lower body portion extends from the upper body portion and defines an inlet volume in communication with the primary volume, the lower body portion comprising a port wall comprising a plurality of ports for receiving cables. The port wall is recessed from an outer edge of the upper body portion, such that the plurality of ports is positioned in a separate plane from the upper body portion and recessed from the outer edge of the upper body portion a distance larger than or equal to a bend radius of a cable connected thereto.

In another embodiment, a fiber drop access point includes a vault and a fiber enclosure positioned within the vault. The vault defines a vault volume sized to receive the fiber enclosure. The fiber enclosure includes an upper body portion and a lower body portion coupled to the upper body portion. The upper body portion defines a primary volume. The lower body portion extends from the upper body portion and defines an inlet volume in communication with the primary volume, the lower body portion comprising a port wall comprising a plurality of ports. The port wall is recessed from an outer edge of the upper body portion, such that the plurality of ports is positioned in a separate plane from the upper body portion and recessed from the outer edge of the upper body portion a distance larger than or equal to a bend radius of a cable connected thereto.

In yet another embodiment, a method of installing a fiber drop access point includes coupling a cable to a port of a fiber enclosure. The fiber enclosure includes an upper body portion and a lower body portion coupled to the upper body portion, wherein the lower body portion comprises a port wall comprising a plurality of ports and the port wall is recessed from an outer edge of the upper body portion, such that the plurality of ports is positioned in a separate plane from the upper body portion and recessed from the outer edge of the upper body portion a distance larger than or equal to a bend radius of the cable. The method further includes winding a slack of the cable within a vault formed within a surface, wherein the wound slack substantially corresponds to a footprint of the fiber enclosure, and placing the fiber enclosure within the vault.

In yet another embodiment, a fiber enclosure includes an upper body portion and a lower body portion coupled to the upper body portion. The upper body portion defines a primary volume. The lower body portion extends from the upper body portion and defines an inlet volume in communication with the primary volume, the lower body portion including a port wall comprising a plurality of ports for receiving cables. The port wall is recessed from an outer edge of the upper body portion, such that the plurality of ports is positioned in a separate plane from the upper body portion and recessed from the outer edge of the upper body portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 1H is a perspective cross-sectional view of the fiber enclosure taken along line 1H-1H of FIG. 1E, according to one or more embodiments shown and described herein;

DETAILED DESCRIPTION

Figure 1A:
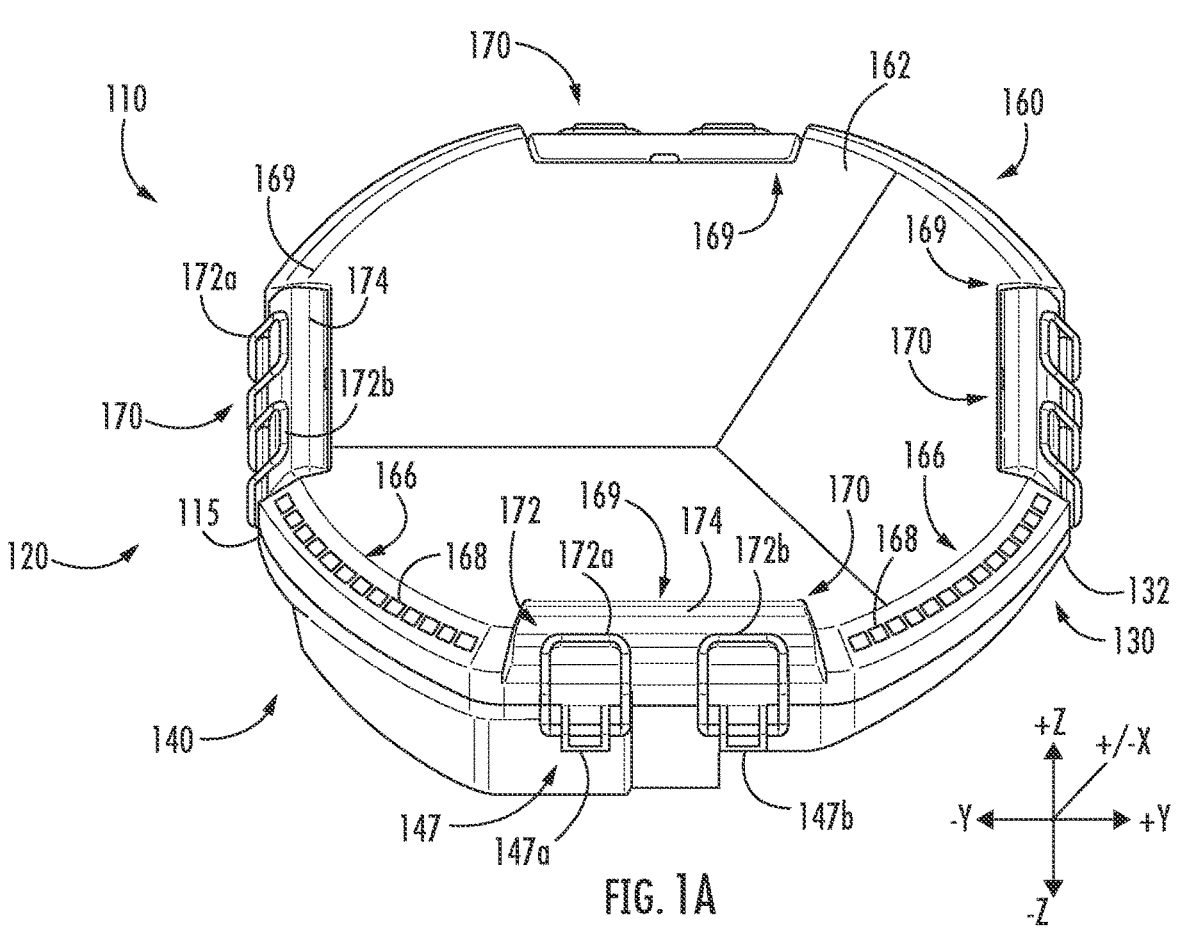
FIG. 1A depicts a top perspective view of a fiber enclosure according to one or more embodiments shown and described herein.

Embodiments of the present disclosure are directed to fiber enclosures, fiber drop access points, and methods for installing fiber drop access points having lower profiles and less excavation are disclosed herein. As noted above, conventional fiber drop access points generally require extensive excavation which can be time consuming and expensive. Additionally, large vaults are required to hold components such as a fiber enclosure and cable slack. However, embodiments of the present disclosure are directed to fiber enclosures having a recessed port wall for receiving cables such as drop fiber cable(s) and the express fiber cable, for example, that is in a separate plane from a primary volume of the fiber enclosure. Such features may allow for slack cables to be wound within a footprint of a fiber enclosure, thereby allowing for more compact fiber drop access points and smaller vaults requiring less excavation.

In particular embodiments, a fiber enclosure includes an upper body portion and a lower body portion coupled to the upper body portion. The upper body portion defines a primary volume and the lower body portion extends from the upper body portion and defines an inlet volume in communication with the primary volume. The lower body portion includes a port wall comprising a plurality of ports. The port wall is recessed from an outer edge of the upper body portion, such that the plurality of ports is positioned in a separate plane from the upper body portion and recessed from the outer edge of the upper body portion a distance larger than or equal to a bend radius of a cable connected thereto. Accordingly, the express fiber cable port and the plurality of drop cable ports may be positioned within a separate plane from the primary volume which may allow for smaller profile fiber enclosures as well as improved slack winding, as will be described in greater detail herein. Additional features and embodiments will be described in greater detail below.

As used herein, the term "fiber enclosure" refers to an enclosure for storage and containment of connections between cables. For example, while the present specification is generally described in terms of fiber optic connections, fiber enclosures according to the present disclosure may include enclosures for electrical and/or other types of connections. In some embodiments, the fiber enclosure may hold of spliced connections and/or connectorized connections between express fiber cables and drop fiber cables, though other uses are contemplated and possible.

As used herein, the term "express fiber cable" refers to the main or trunk fiber optic cable which may be routed between various fiber drop access points to which drops cables are spliced to allow signal transportation from the express fiber cable to the drop fiber cable. Though not depicted, and as would be understood, the express fiber cable generally includes an outer casing and a plurality of tubes within the outer casing, each tube includes a plurality of optical fibers positioned therein. In some cases the express fiber cable may further include a stiffening component, rod, or casing which provides increased stiffness to the express fiber cable.

As used herein, the term "drop fiber cables" or "drop cables," are fiber optic cables including one or more optical fibers, which are spliced to one or more optical fibers of the express fiber cable and provide communication to buildings, signal splitters, or the like. Accordingly, drop fiber cables generally include a lower number of fibers as compared to the express fiber cable.

As used herein, the term "coiling" or "coil" refers a winding motion or a wound or spiraled arrangement of a cable, tube, or wire. For example, and as will be described in greater detail herein, express fiber cables and/or drop fiber cables may be wound for storage within a vault. Similarly, expressed tubes of the optical cables, and/or stripped optical fibers may similar be coiled within the fiber enclosure.

Figure 1B:
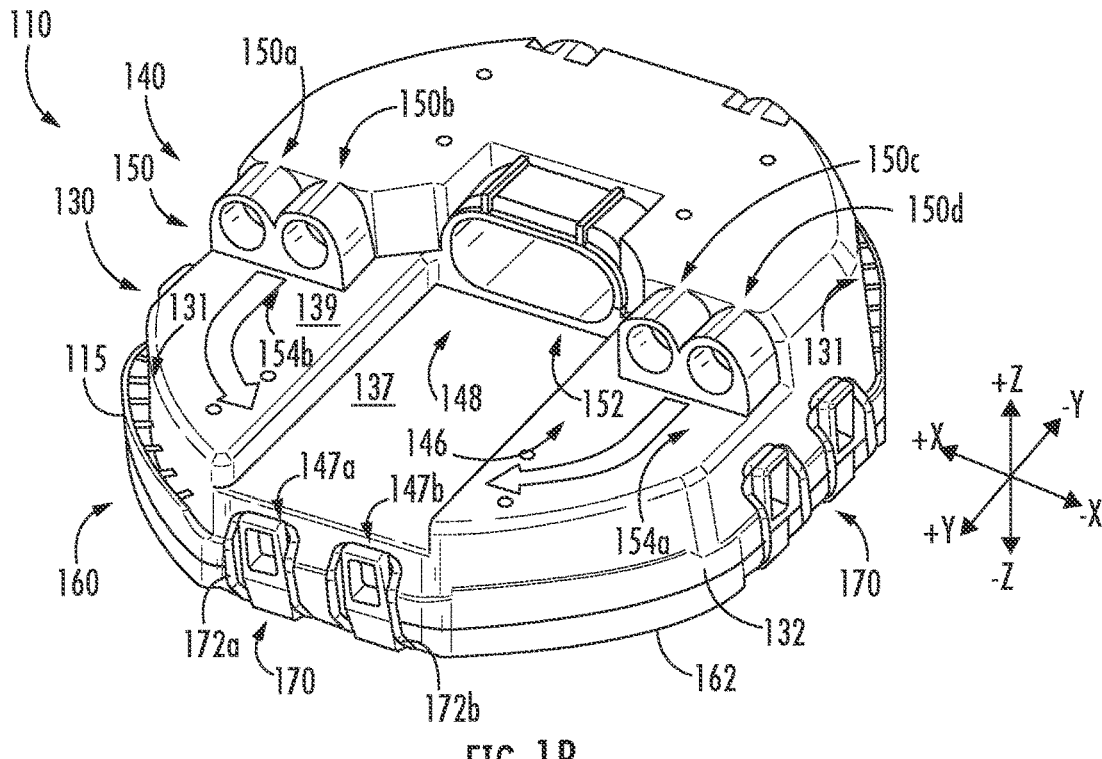
FIG. 1B depicts a bottom perspective view of the fiber enclosure of FIG. 1A, according to one or more embodiments shown and described herein.
Figure 1C:
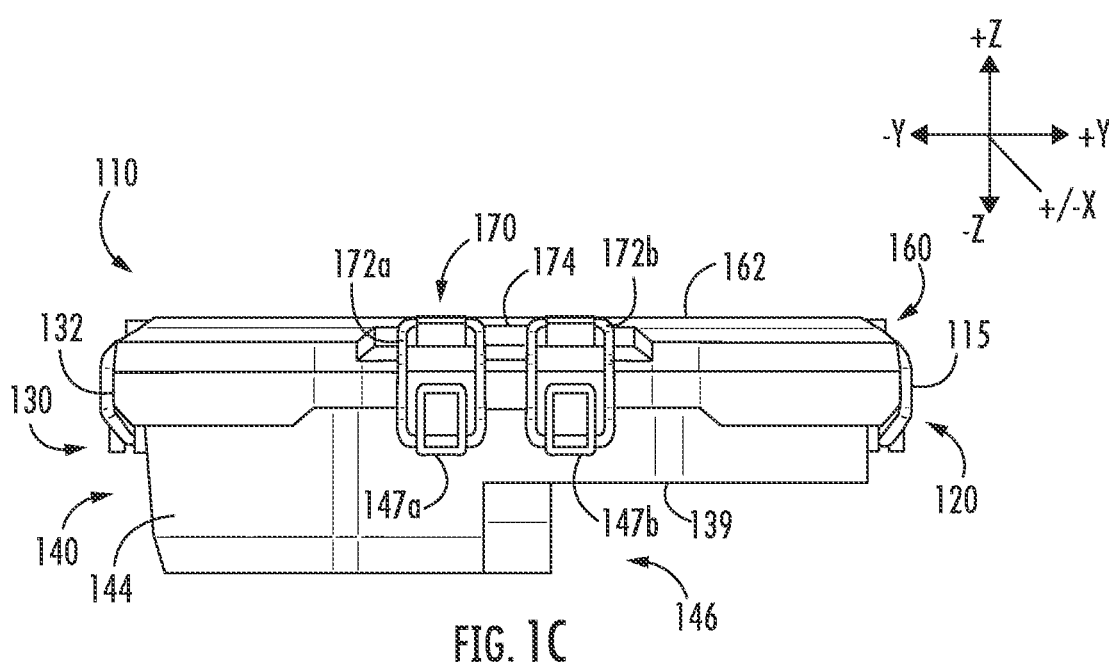
FIG. 1C depicts a side view of the fiber enclosure of FIG. 1A, according to one or more embodiments shown and described herein.
Figure 1D:
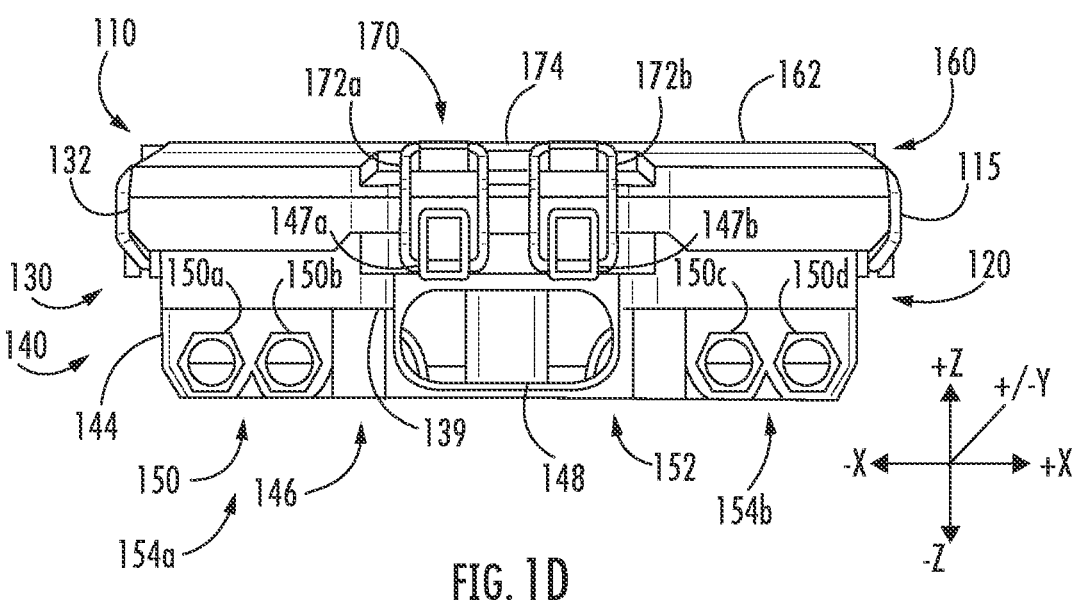
FIG. 1D depicts a front view of the fiber enclosure of FIG. 1A, according to one or more embodiments shown and described herein.
Figure 1E:
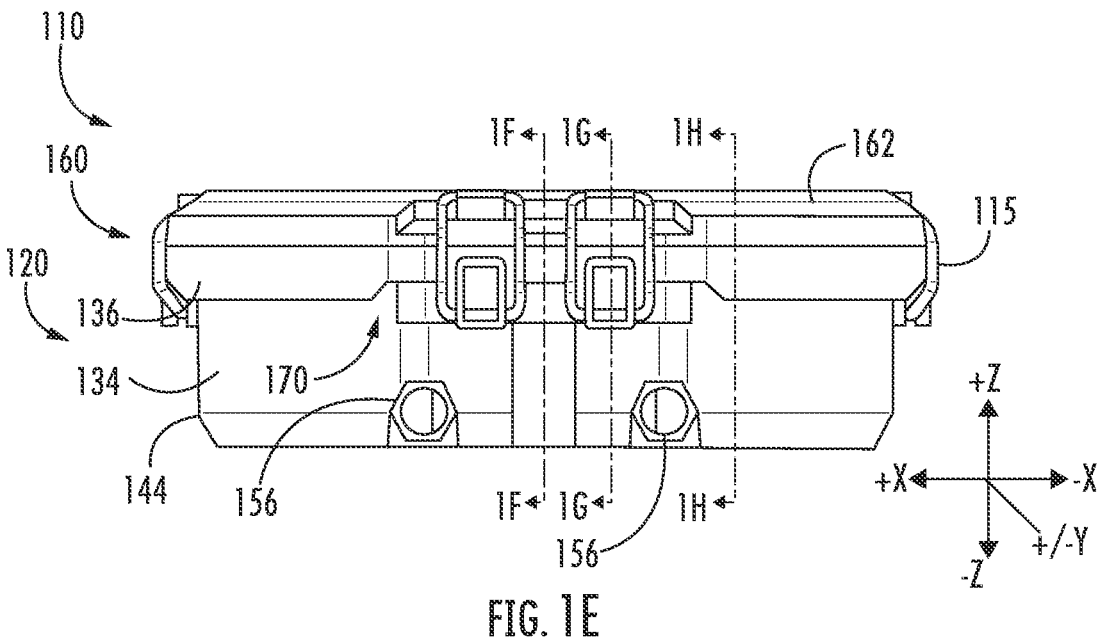
FIG. 1E depicts a rear view of the fiber enclosure of FIG. 1A, according to one or more embodiments shown and described herein.
Figure 1F:
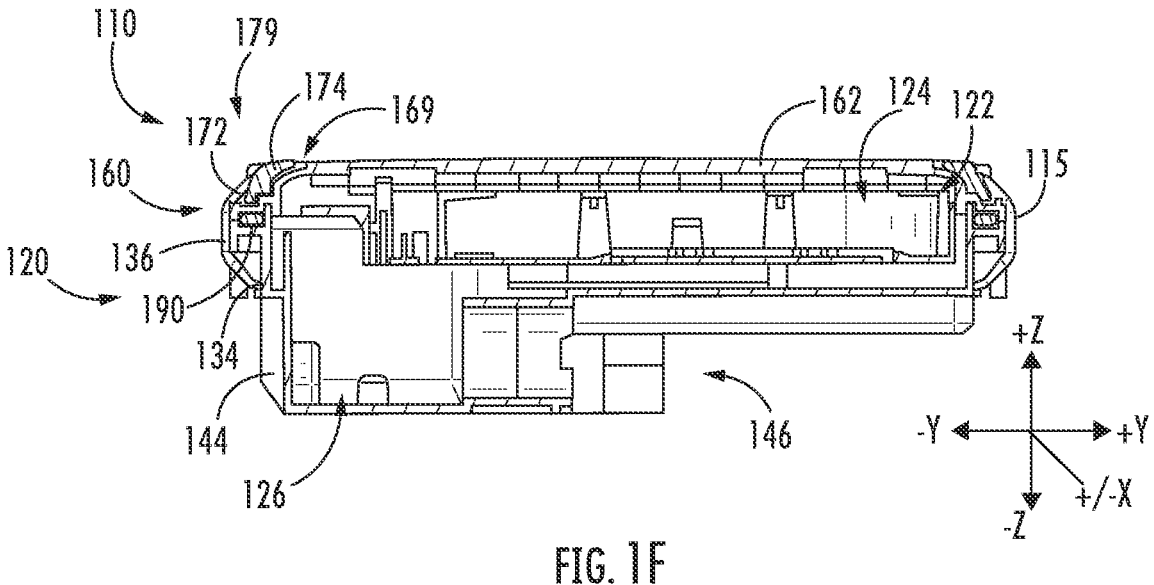
FIG. 1F depicts a cross-sectional view of the fiber enclosure taken along line 1F-1F of FIG. 1E, according to one or more embodiments shown and described herein.
Figure 1G:
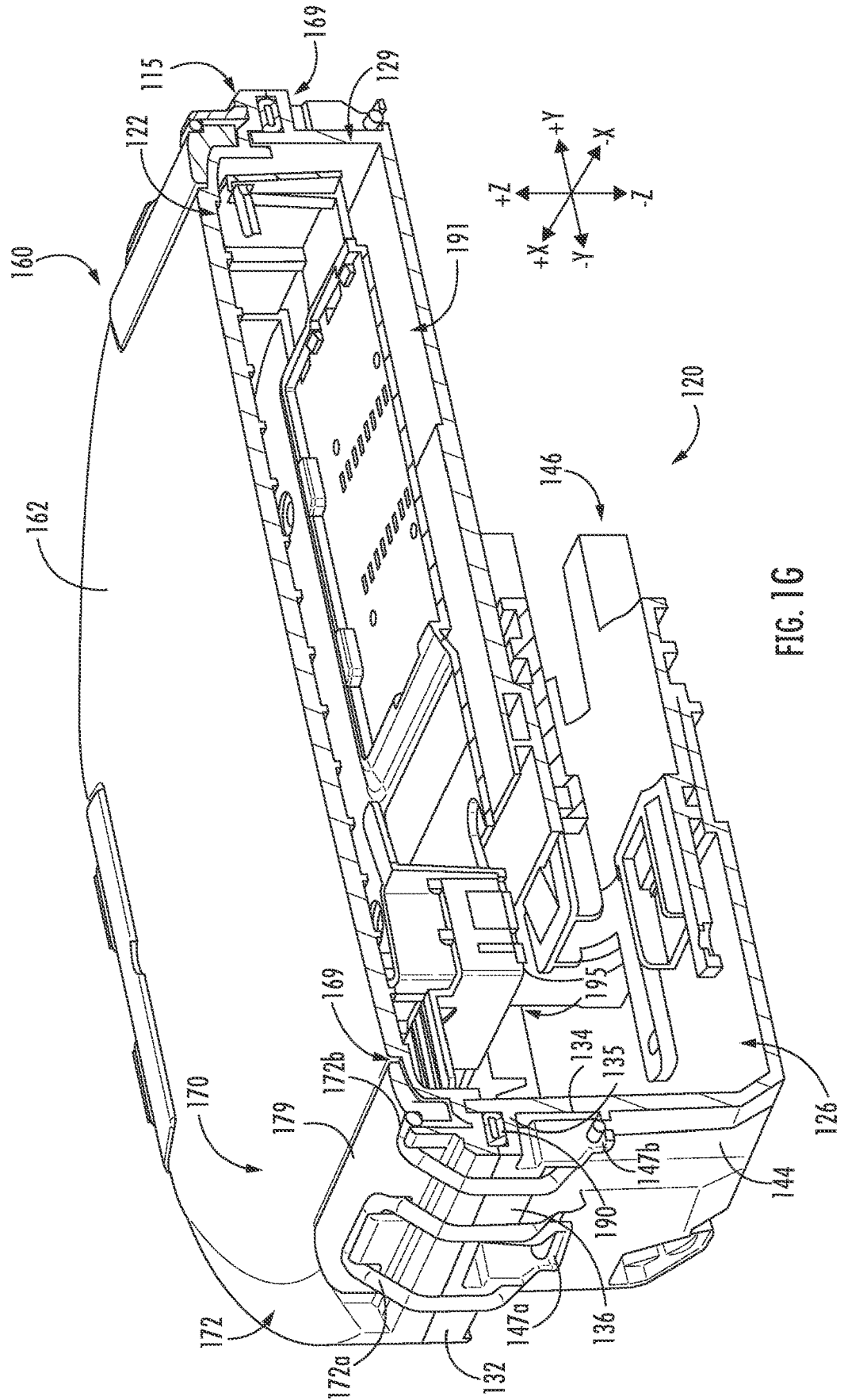
FIG. 1G depicts a perspective cross-sectional view of the fiber enclosure taken along line 1G-1G of FIG. 1E, according to one or more embodiments shown and described herein.
Figure 1I:
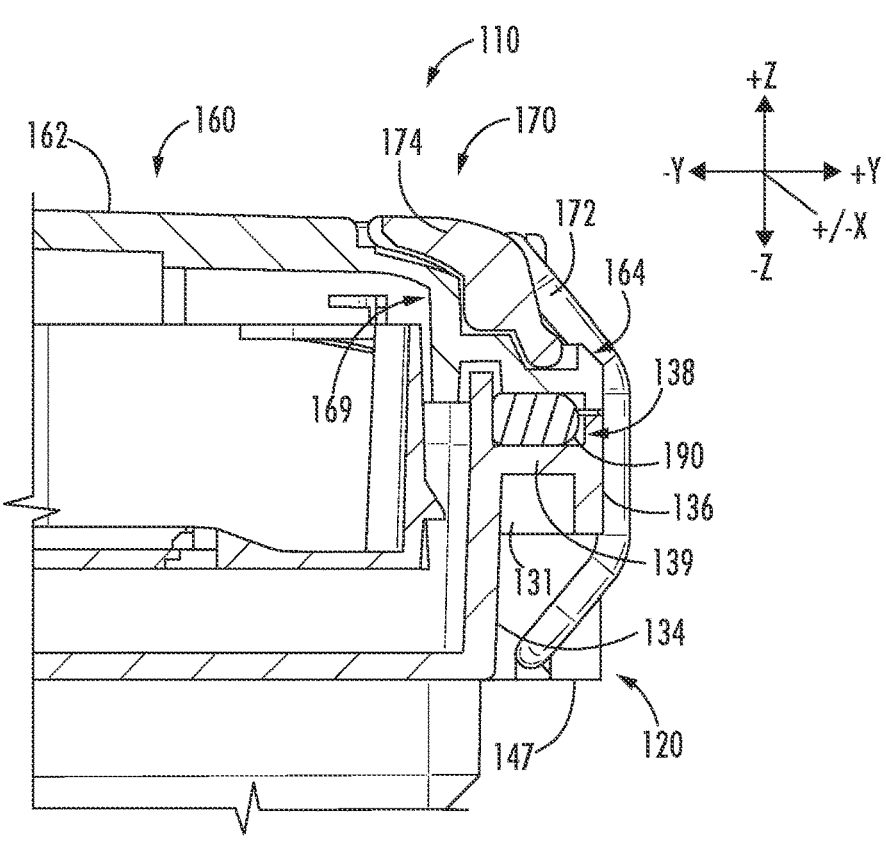
FIG. 1I is a detailed cross-sectional view of the fiber enclosure taken at a clamp coupling a top of the fiber enclosure to a closure body of the fiber enclosure, according to one or more embodiments shown and described herein.
Figure 1J:
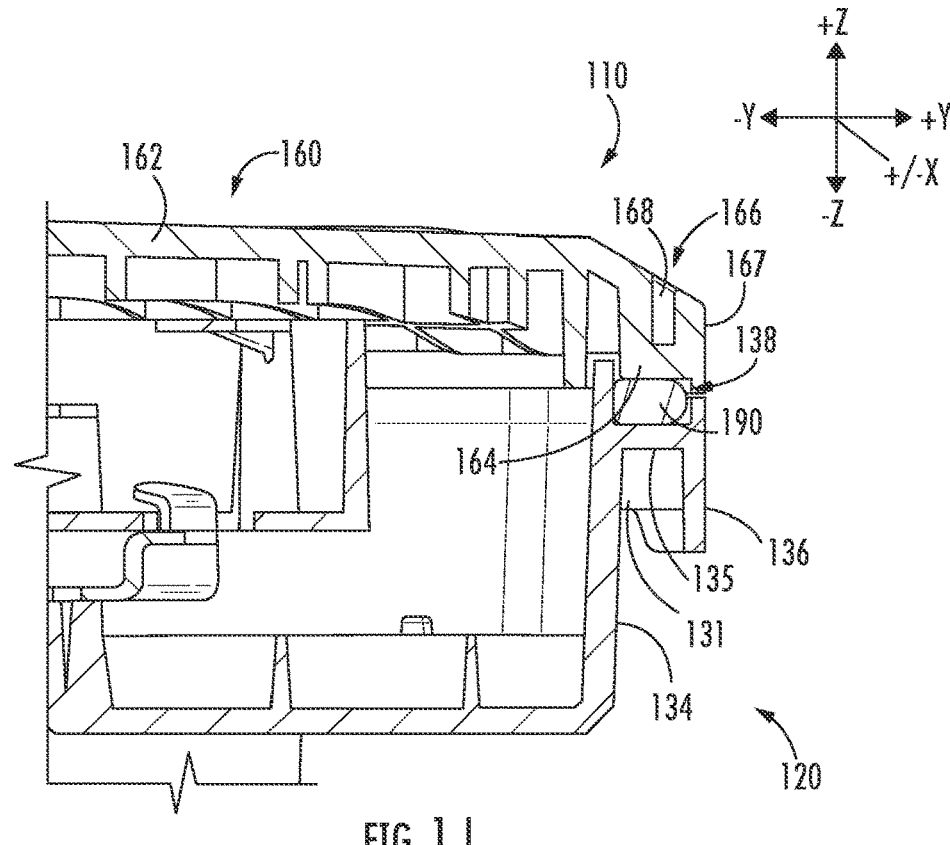
FIG. 1J is a detailed cross-sectional view of the fiber enclosure taken at a position spaced from the clamp of FIG. 1I, according to one or more embodiments shown and described herein.

FIGS. TA-1J depicts various views of an example fiber enclosure 110. FIG. TA generally depicts a perspective top view of the fiber enclosure 110; FIG. 1B generally depicts a bottom perspective view of the fiber enclosure 110; FIG. 1C depicts a side view of the fiber enclosure 110, FIG. 1D depicts a front view of the fiber enclosure 110; FIG. 1E depicts a rear view of the fiber enclosure 110; FIG. 1F depicts a cross-section of the fiber enclosure 110 taken along line 1F-1F of FIG. 1E; FIG. 1G depicts a cross-section of the fiber enclosure 110 taken along line 1G-1G of FIG. 1E; FIG. 1H depicts a cross-section of the fiber enclosure 110 taken along line 1H-1H of FIG. 1E; FIG. 1I depicts a more detailed cross-sectional view of the fiber enclosure 110 at a clamp 170 of the fiber enclosure 110; and FIG. 1J depicts a more detail cross-section view of an edge 115 of the fiber enclosure 110 at a position radially spaced from the clamp 170. Embodiments are not limited to that shown in FIGS. 1A-1J. In particular, embodiments may include a greater or fewer number of features and/or components, including different components, without departing from the scope of the present disclosure. It is also noted that references to top, bottom, rear, front, or other directional indicators are used for convenience and generally refer to orientations in the depicted coordinate axes. Such directional indicators are not necessarily intended to limit scope of any embodiments of the present disclosure.

Referring collectively to FIG. 1A-1J, the example fiber enclosure 110 generally includes a closure body 120. In some embodiments, the fiber enclosure 110 may further include a lid 160 removably coupled to the closure body 120. The closure body 120 and/or the lid 160 may be formed through a variety of manufacturing processes such as, but not limited to injection molding, vacuum casting, thermoforming, additive manufacturing, or the like. The closure body 120 and the lid 160 may be formed from any conventional material such as, but not limited to, high density polyethylene (HDPE), low density polyethylene (LDPE), polyethylene terephthalate, polystyrene, polypropylene, polyvinyl chloride, etc. In some embodiments, the fiber enclosure 110 may further include a plurality of clamps 170 coupling the lid 160 to the closure body 120. As will be described in greater detail herein, the fiber enclosure 110 is sized and shaped to encourage coiling of slack of cables coupled thereto, such as but not limited to, the express fiber cable 20 and the one or more drop fiber cables 30, substantially within a footprint of the fiber enclosure 110 and/or a vault 102 (depicted in FIGS. 6A-6D), as will be described in greater detail below.

The closure body 120 of the fiber enclosure 110 may include an upper body portion 130 and a lower body portion 140, which extends from the upper body portion 130 in the −Z direction of the depicted coordinate axes. The upper body portion 130 and the lower body portion 140 may be integral with one another so as to form a single unitary body.

The upper body portion 130 has an outer edge 132 that generally defines the shape of the upper body portion 130 in the XY plane of the depicted coordinate axis. For example, the shape of the upper body portion 130 may be generally round or circular. However, as depicted the outer edge 132 as depicted best in FIG. 1A, may have one or more linear portions such as where the plurality of clamps 170 couples the closure body 120 to the lid 160. Accordingly, the upper body portion 130 may have a substantially octagonal shape, such as where four clamps 170 are used, though other shapes are contemplated and possible.

Referring to FIGS. 1F-1J, the outer edge 132 may be defined by one or more edge walls. For example, the upper body portion 130 may include such has an inner edge wall 134 and an outer edge wall 136 spaced externally from inner edge wall 134. A body lip 135 may extend between and connect the inner edge wall 134 to the outer edge wall 136. The body lip 135, the inner edge wall 134 and/or the outer edge wall 136 may define an O-ring recess 138 sized and shaped to receive an O-ring 190 therein, as best depicted in FIGS. 1I and 1J. As will be described in greater detail herein, the O-ring 190 may provide a fluid tight seal between the lid 160 and the closure body 120 when the lid 160 and the closure body 120 are coupled to one another. It is noted that in embodiments without a lid 160, there may not be an O-ring 190 or a body lip 135. Instead, the upper body portion 130 may simply include a top wall immovably coupled to the one or more edge walls.

In embodiments including a body lip 135, and as best shown in FIGS. 1B, 1J, and 1I, between the inner edge wall 134 and the outer edge wall 136 may be a plurality of body ribs 131 (such as two or more body ribs, four or more body ribs, eight or more body ribs, etc.) within each section between adjacent clamps 170. Referring to FIG. 1J, the plurality of body ribs 131 may be coupled to each of the inner edge wall 134, the outer edge wall 136, and the closure body lip 135. Accordingly, the plurality of body ribs 131 may provide increased stiffness to the closure body 120 at positions between adjacent clamps 170, where the closure body lip 135 may otherwise experience structural relaxation without the plurality of body ribs, which may result in reduced pressure on the O-ring 190 thereby providing a reduced seal.

As depicted in FIGS. 1F-1H, the upper body portion 130 may define a primary volume 124 therein. The primary volume 124 may be sized to house a plurality of components and/or connections such as but not limited to spliced or other connections between optical fibers, as will be described in greater detail herein. It is noted that additional or different components may be housed within primary volume 124. For example, positioned within the upper body portion 130 may be a splice tray 191, a standoff tray 175, one or more optical components 180 (such as but not limited to a wavelength division multiplexing unit (WDM), a dense wavelength division multiplexing unit, optical splitters, patching component(s) (e.g., LC and/or MDC bulkheads) etc.), electrical components, electrical connections, etc.

Referring collectively again to FIGS. 1A-1H, the lower body portion 140 extends from the upper body portion 130 in the −Z direction of the depicted coordinate axes. As depicted in FIGS. 1F-1H, the lower body portion 140 defines an inlet volume 126 that is in communication with (i.e., open to) the primary volume 124 of the upper body portion 130. For example, and as will be described in greater detail below, cables (such as an express fiber cable and/or one or more drop fiber cables) may enter the fiber enclosure 110 at the lower body portion 140 (i.e., in a different plane from the primary volume 124 of the upper body portion 130).

In embodiments, the lower body portion 140 comprises a lower body edge wall 144. The lower body edge wall 144 defines the boundary of the lower body portion 140 in the XY plane of the depicted coordinate axes. It is noted that the lower body edge wall 144 may be substantially continuous with the inner edge wall 134 of the upper body portion 130 for a portion of an outer perimeter of the upper body portion 130. However, at least a portion of the lower body edge wall 144 is recessed related to the inner edge wall 134 of the upper body portion 130. For example, a portion of the lower body edge wall 144 is a port wall 146 that is recessed relative to the outer edge 132 of the upper body portion 130. For example, the port wall 146 may cut across the upper body portion 130 at a distance larger than or equal to a bend radius (e.g., a minimum bend radius) of a cable connected to the port wall 146. For example, the port wall 146 may be approximately positioned at a central region of the upper body portion 130, though other positions are contemplated and possible. As used herein "bend radius" refers to a radius at which a cable may be coiled without interference of operation of optical and/or electrical communications through the cable. In some embodiments, the port wall 146 may be recessed about 1 in. or more, such as about 2 in. or more, such as about 3 in. or more, such as about 4 in. or more, such as about 5 in. or more, such as about 6 in. or more, etc.

As best depicted in FIGS. 1B and 1D, the port wall 146 may include a plurality of ports such as an express fiber cable port 148 and a plurality of drop cable ports 150a-150d providing entry into the inlet volume 126. It is noted that while the present embodiment depicts a single express fiber cable port and four drop cable ports, in embodiments, there could be any number of express fiber cable ports and drop cable ports without departing from the scope of the present disclosure. In some embodiments, one or more of the ports may be ports for receiving electrical cables. In some embodiments, the port wall is positioned in an orthogonal plane to an axis with respect to the plurality of ports. However, in other embodiments, the plurality of ports may be arranged in any direction and/or a direction of each port may vary from one another.

The express fiber cable port 148 and the plurality of drop cable ports 150a-150d are positioned below the upper body portion 130 and recessed from the outer edge 132 of the upper body portion 130 a distance larger than or equal to a bend radius (e.g., a minimum bend radius) of a cable connected to the port wall 146. By recessing the express fiber cable port 148 and the plurality of drop cable ports 150a-150d from the outer edge 132 of the upper body portion 130 a distance larger than or equal to a bend radius (e.g., a minimum bend radius) of a cable connected to the port wall 146, a portion of the width of the closure body 120 may be used to begin cable coiling of slack beneath the fiber enclosure 110, which will be described in greater detail below. In the depicted embodiment, each of the express fiber cable port 148 and the plurality of drop cable ports 150 may face the same direction. For example, each of the express fiber cable port 148 and the plurality of drop cable ports 150a-150d are directed along the +Y direction of the depicted coordinate axes, though other configuration are contemplated and possible. In some embodiments, the plurality of ports may face different directions. By recessing the drop cable ports 150a-150d and the express fiber cable port 148 beneath the upper body portion, the fiber enclosure 110 may also have lower profile. as splicing may take place on a separate plane from fiber entry.

Referring specifically to FIG. 1D, the express fiber cable port 148 and the plurality of drop cable ports 150a-150d may be arranged in a substantially linear array in the +/−X direction of the depicted coordinate axes. For example, a common plane parallel to the XY plane of the depicted coordinate axes may pass through each of the plurality of drop cable ports 150a-150d and the express fiber cable port 148, though other embodiments are contemplated and possible. However, in some embodiments, it is contemplated that the express fiber cable port 148 and the plurality of drop cable ports 150a-150b may be on separate planes from one another.

Each of the ports of the plurality of ports may be sized and shaped to receive a connector, such as an optical connector (e.g., a single and/or multi-fiber optical connector) though other connectors (e.g., electrical connectors, pluggable connectors for non-spliced connections, or the like) may be included. For example, it is noted that in the depicted embodiment, the express fiber cable port 148 is substantially larger that than the adjacent drop cable ports 150a-150d. For example, an express fiber cable may be substantially larger than a drop fiber cable. Additionally, and as will be described in greater detail herein, the express fiber cable port 148 may be sized and shaped to receive a double external cable assembly module (ECAM) entry port and sealing grommet assembly 48 (depicted in FIG. 6C), such as the commercially available Double ECAM D18 from CORNING OPTICAL COMMUNICATIONS, may be inserted into the express fiber cable port 148. The plurality of drop cable ports 150a-150d may be sized and shaped to receive a single ECAM entry port and sealing grommet assembly 68 (depicted in FIG. 6C), such as the commercially available ECAM S9.5 from CORNING OPTICAL COMMUNICATIONS. Due to the larger size of the express fiber cable port 148, formed within a base wall 139 of the upper body portion 130 may be a channel 137 (depicted in FIG. 1B) extending from the outer edge 132 to the express fiber cable port 148, which may aid in maintaining a lower profile to the fiber enclosure 110. The ECAMs and sealing grommet assemblies 48, 68 when positioned within the applicable port form a fluid tight seal with the port. It is noted that when a port is not in use, the port may be sealed with a plug or cap (not shown).

As shown in FIG. 1B, in embodiments the port wall 146 may include a plurality of portions which may be offset from one another in the Y direction of the depicted coordinate axes. Each section may include one or more ports of the plurality of ports. For example, the port wall 146 may include an express fiber cable mounting portion 152 that includes the express fiber cable port 148 and one or more drop fiber cable mounting portions that include one or more of the plurality of drop cable ports 150a-150d. As illustrated, the port wall 146 of the example embodiment, includes a centrally located express fiber cable mounting portion 152 and a first drop fiber cable mounting portion 154a and a second fiber cable mounting portion 154*b* arranged on either side of the centrally located express fiber cable mounting portion 152 in the +/−X direction of the depicted coordinate axes. In the depicted embodiment, the centrally located express fiber cable mounting portion 152 is recessed in the −Y direction of the depicted coordinate axes relative to a location of the adjacent first and second drop fiber cable mounting portions 154*a*, 154*b*. However, it is noted that other configurations are contemplated and possible. For example, it is contemplated that the various mounting portions may not be offset from one another.

Referring to FIG. 1E, in some embodiments, one or more inline ports 156 may be formed along the outer edge 115 within a shared edge wall of the upper body portion 130 and the lower body portion 140 as opposed to be recessed from the outer edge wall 136 and the inner edge wall 134, as depicted above. The one or more inline ports 156 may provide an express fiber cable port, a drop cable port, or other type cable port (e.g., electrical cable), or any combination thereof into the inlet volume 126. When not in use, the one or more inline ports 156 may be plugged or capped (not shown) to prevent fluid and/or debris entry through the one or more inline ports 156. In some embodiments, it is contemplated that the one or more inline ports 156 may be recessed from the outer edge 115 of the upper body portion 130 similar to the port wall 146, described above. For example, in some embodiments, the fiber enclosure 110 may include two port walls opposite from one another that are recessed from the outer edge 115 of the upper body portion 130.

Referring collectively again to FIGS. 1A-1J, the lid 160 is removably coupled to the upper body portion 130 opposite the lower body portion 140. In particular, the lid may be removed to allow full access to the interior of the closure body 120. That is, the lid 160 may be coextensive with the closure body 120 in the XY plane of the depicted coordinate axes. The lid 160 may generally enclose the primary volume 124 and the inlet volume 126 to prevent contaminate entry. In embodiments, the lid 120 may add to a volume of the fiber enclosure 110. For example, the lid 120 may be domed or may otherwise extend in the +Z direction of the depicted coordinate axes to provide additional volume for the primary volume 124. In some embodiments, where additional volume within the primary volume 124 is desired, one or more expansion rings or portions could be added between the lid and the fiber enclosure 110. It is noted in some embodiments, there may not be a lid 130 or the lid may be positioned elsewhere. In such embodiments, in place of the lid 130 may be a top wall positioned opposite from the lower body portion 140.

Figure 11:
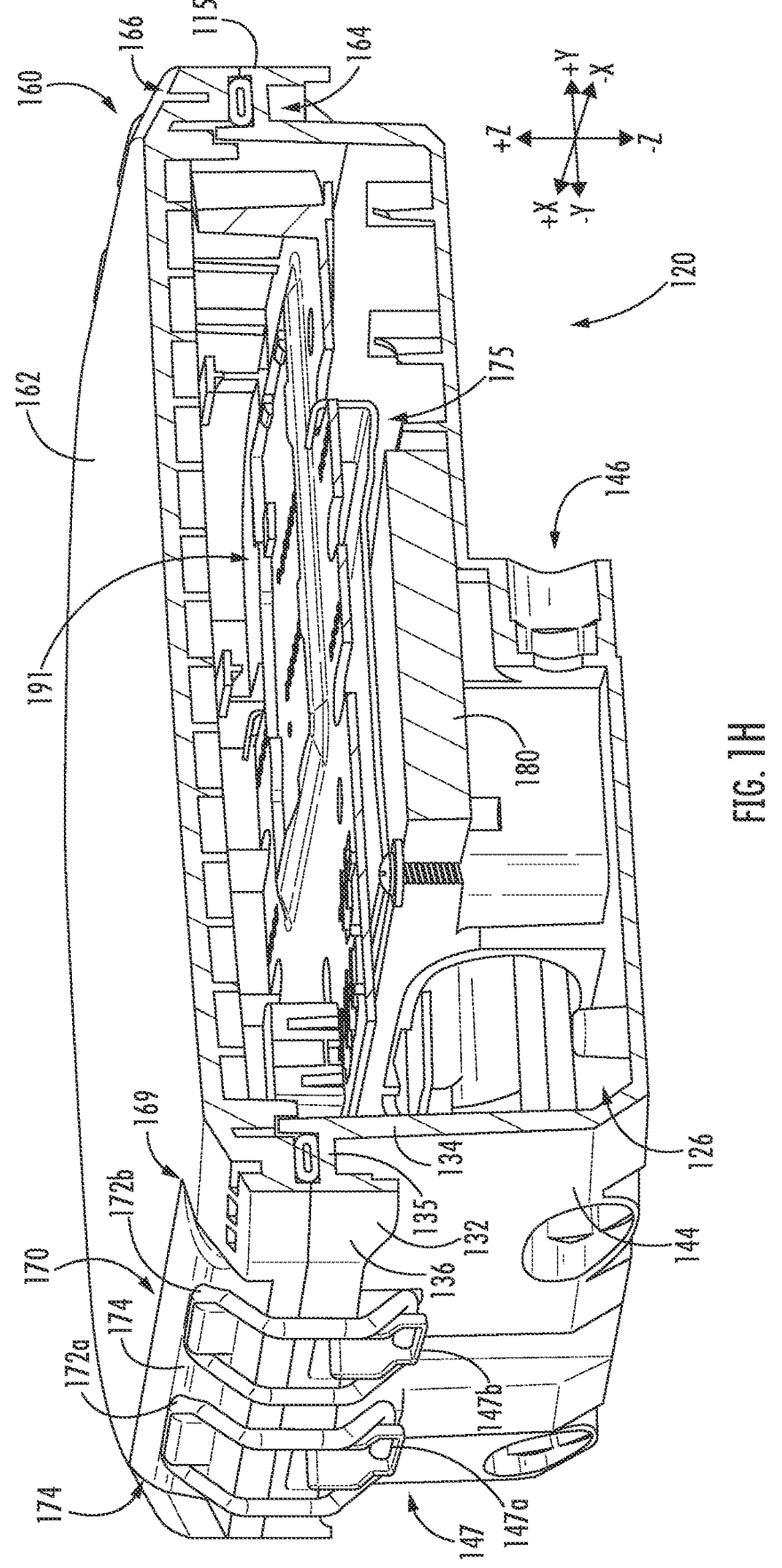

In various embodiments, the lid 160 has a lid body 162 and extending from the lid body 162 is a lid lip 164, as best illustrated in FIGS. 11 and 1J. The lid lip 164 may be aligned with the closure body lip 135 to compress the O-ring 190 between the lid lip 164 and the closure body lip 135, thereby providing a fluid-tight seal between the lid 160 and the closure body 120. The shape of the lid 160 may substantially match the shape of the upper body portion 130 of the closure body 120. For example, the lid 160 may be generally round. However, as depicted the outer edge 161 of the lid 160 may have one or more linear portions such as where the plurality of clamps 170 couples the closure body 120 to the lid 160. Accordingly, the lid 160 may have a substantially octagonal shape, such as where four clamps 170 are used, though other shapes are contemplated and possible.

In the embodiment depicted in FIGS. TA-1J, around an outer edge 167 of the lid 160 may be a plurality of voids 166 separated from one another via separation wall 168 or rib. For example, the plurality of voids 166 may be arranged into a plurality of arrays, in between each clamping location, as will be described in greater detail below. Referring to FIG. 1J, the plurality of voids 166 may be aligned with and arranged above in the +Z direction of the depicted coordinate axes, the lid lip 164. The plurality of voids 166 may reduce the material amount used for manufacture of the lid 160, while the separation walls 168 provide rigidity which may prevent separation or relaxation of the seal between the lid 160 and the closure body 120 at locations between the clamp 170 locations. Each array may include a number of voids 166. Such as four or more, eight or more, sixteen or more, or the like.). In some embodiments, there may not be any voids 166.

Still referring to FIGS. TA-1J, securing means may secure the lid 160 to the closure body 120. For example, securing means may include any number of clamps, fasteners, adhesives, or the like. In some embodiments, the lid 160 and/or the closure body 120 may be threadingly engaged. In the depicted embodiment, the securing means includes a plurality of clamps 170 configured to secure the lid 160 to the closure body 120, specifically the upper portion of the closure body 120, at a designated clamping location. For example, the plurality of clamps 170 may include two or more clamps, such as four clamps, which may be spaced around a perimeter of the fiber enclosure 110. In some embodiments, the plurality of clamps 170 may be equally spaced around the perimeter of the fiber enclosure 110, though other configurations are contemplated and possible. In embodiments, each clamp 170 may include one or more hoops 172 and an anchor 174 coupled to the one or more hoops 172. For example, in the depicted embodiment, each clamp 170 includes a first hoop 172*a* and a second hoop 172*b* coupled to a common anchor 174.

The lid 160 may define a clamp port 169 corresponding to each clamp 170 of the plurality of clamps 170. For example, the anchor 174 may be configured to latch (e.g., via hooking onto any number of hooks, ridges, ledges or the like) onto the clamp port 169 to couple the clamp 170 to the clamp port 169. The closure body 120 may include one or more hooks 147 formed at a location corresponding to each clamp port 169 of the lid 160. For example, there may be a first hook 147*a* and a second hook 147*b* positioned adjacent to the first hook 147*a*, which may be engaged with the first hoop 172*a* and the second hoop 172*b* respectively. However, it is noted that the clamps 170 and the clamp ports 169 may take on other or different configurations. For example, in some embodiments, there may only be a single hoop and hook interface.

Accordingly, in practice the lid 160 may be arranged on top of the closure body 120. At each clamp port 169 the one or more hoops 172 may be hooked over the one or more hooks 147 formed on the closure body 120 at the corresponding position. The anchor 174 may be rotated over the lid 160 and snapped, folded, or otherwise positioned within the corresponding clamp port 169, which compresses the lid 160 toward the closure body 120 and compresses the O-ring 190, which may provide a substantially fluid-tight seal between the lid 160 and the closure body 120.

Figure 2A:
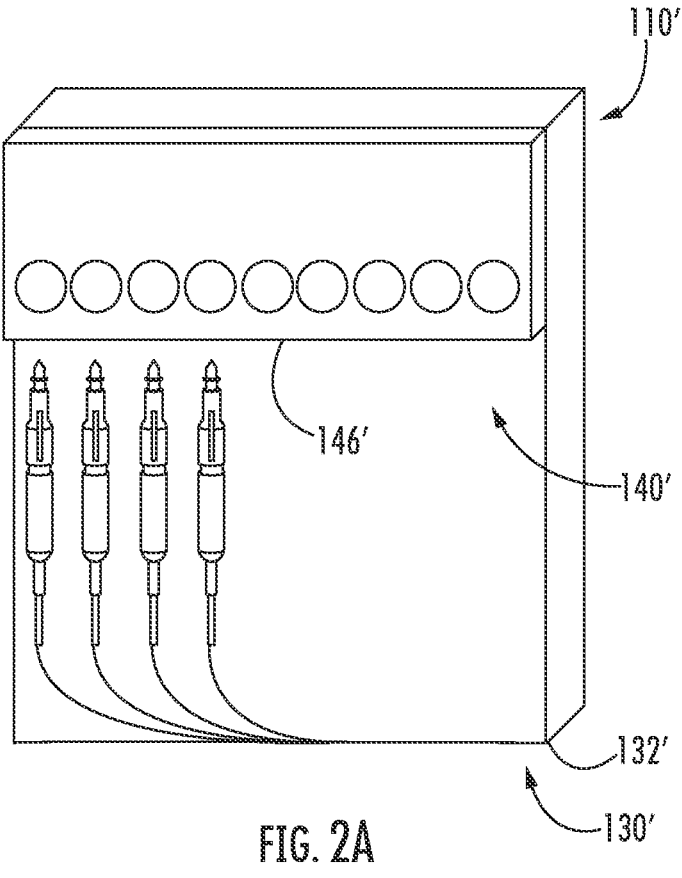
FIG. 2A schematically depicts a rectangular fiber enclosure, according to one or more embodiments shown and described herein.
Figure 2B:
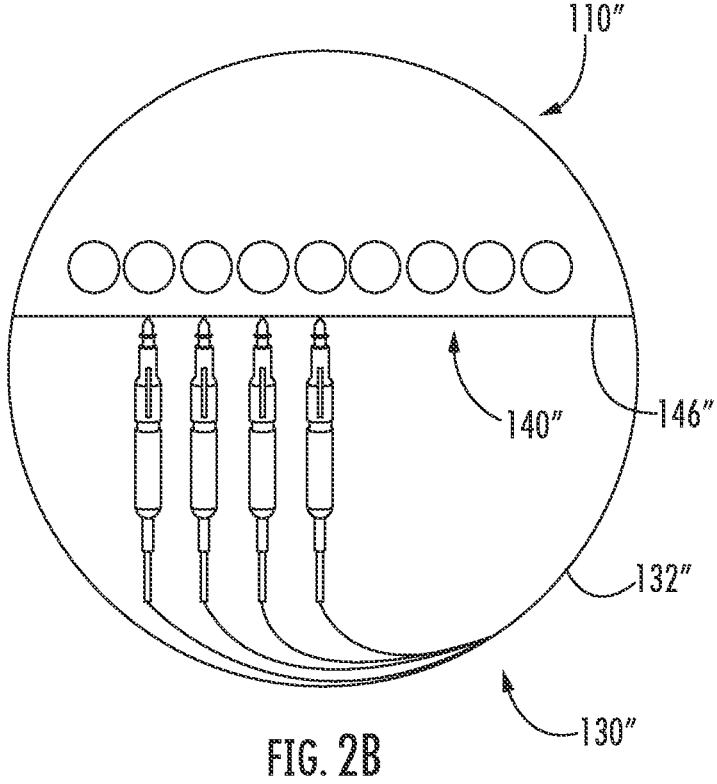
FIG. 2B schematically depicts a circular fiber enclosure, according to one or more embodiments shown and described herein.

FIGS. 2A and 2B depict alternatively shaped fiber enclosures 110' and 110" incorporating a similar design. In particular, each of the fiber enclosures 110' and 110" of FIGS. 2A and 2B illustrate a fiber enclosure 110 including an upper body portion 130', 130" and a lower body portion 140', and 140" such as described above, except having a rectangular and round cross-section respectfully. Accordingly, it is noted that further shapes having a port wall 146', 146" offset from an outer edge 132' and 132" are contemplated and possible.

Figure 3A:
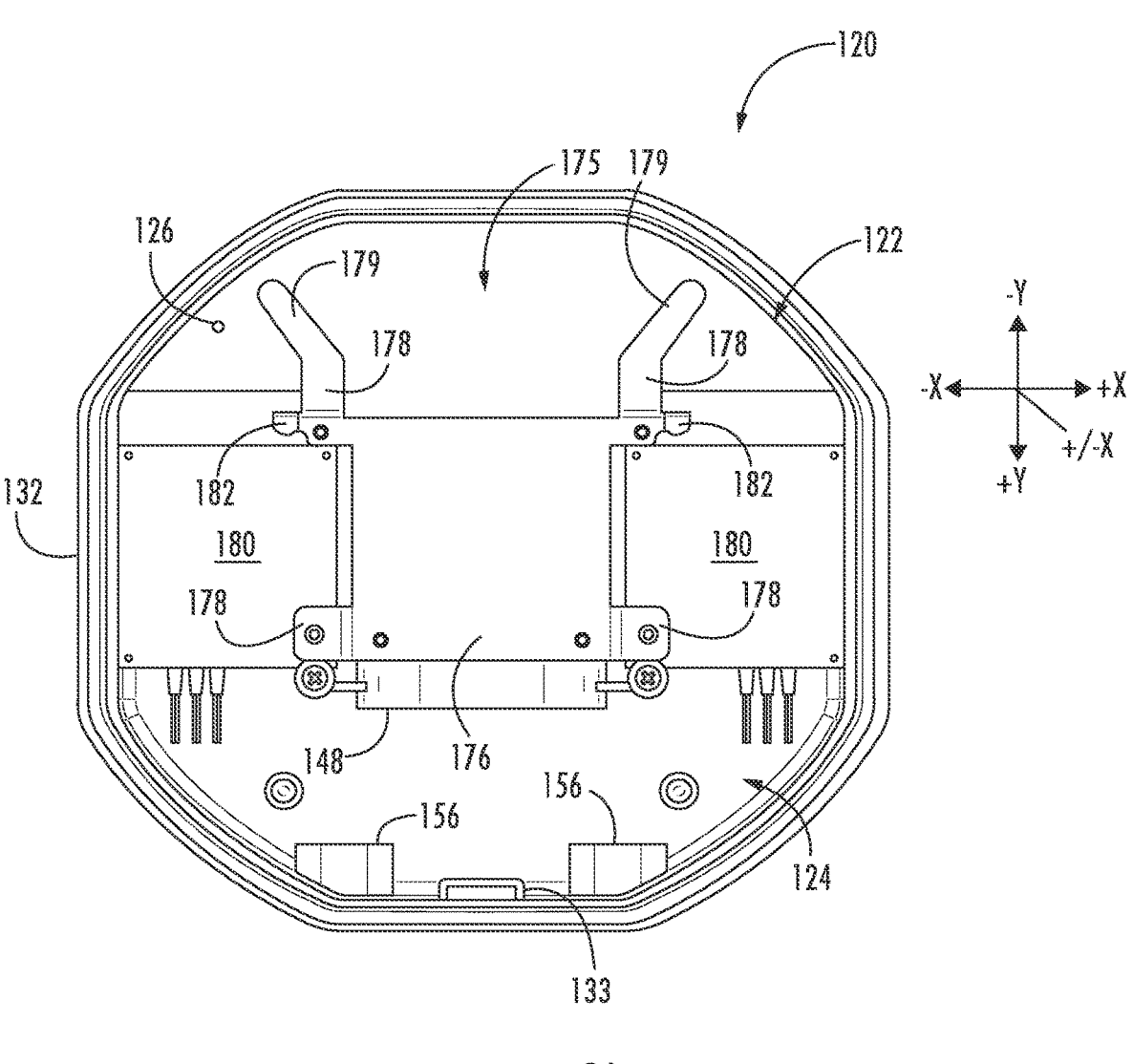
FIG. 3A depicts atop view of an interior of the fiber enclosure of FIGS. 1A-1J, including one or more optical components and a standoff tray, according to one or more embodiments shown and described herein.
Figure 3B:
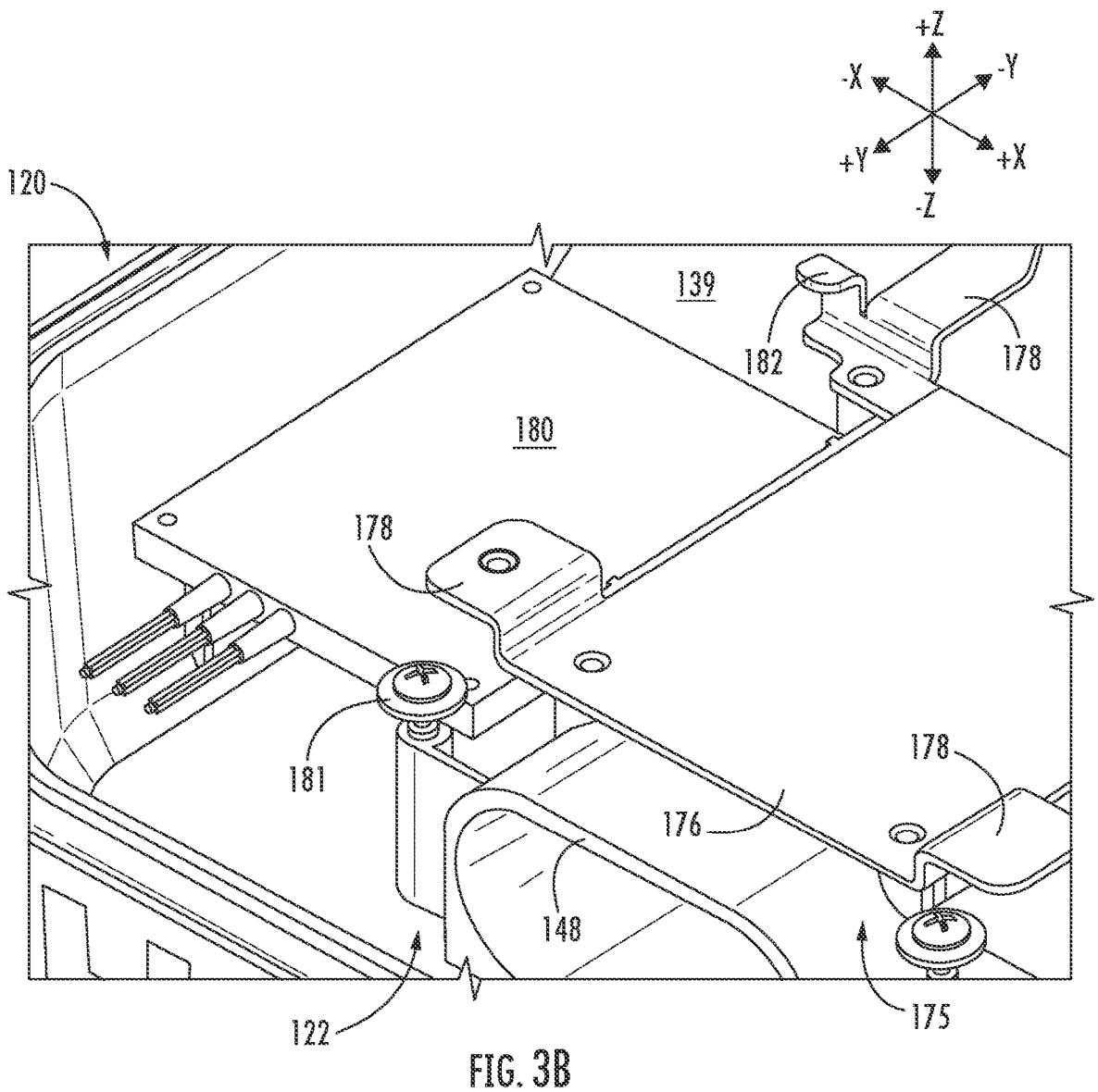
FIG. 3B depicts a perspective view of the interior of the fiber enclosure of FIG. 3A, according to one or more embodiments shown and described herein.

Referring now to FIGS. 3A and 3B, an interior of the closure body 120 will now be described. It is noted that the interior of the closure body 120 may generally apply to any of the above-described embodiments, though specifically the embodiments discussed with respect to FIGS. 1A-1J. In particular, the closure body 120 is depicted with the lid 160 and splice tray 191 removed. As noted above, the closure body 120 may have an internal volume 122, which is sufficient to store fiber and/or wire slack, as will be described in greater detail below, the one or more optical components 180 (e.g., modular cassettes, splitters, multiplexing devices, WDMs, patching component(s) (e.g., LC and/or MDC bulkheads), etc.), the splice tray 191, the standoff tray 175, etc. The internal volume 122 includes the primary volume 124 and the inlet volume 126.

In embodiments, the one or more optical components 180 may be positioned within the primary volume 124 above the inlet volume 126 in the +Z direction of the depicted coordinate axes. For example, the one or more optical components 180 may be positioned on the base wall 139 of the upper body portion 130 and may be held in place with one or more fasteners 181, which may be coupled to the closure body 120. In some embodiments, and as depicted, an optical component of the one or more optical components 180 may be positioned within the upper body portion 130 on either (or both) side of the express fiber cable port 148. That is, the upper body portion 130 may have one or more defined locations for receiving and holding the one or more optical components 180.

Positioned above the express fiber cable port 148 may be the standoff tray 175 mounted to the upper body portion 130 within the primary volume 124. For example, the standoff tray 175 may include a base substrate 176 coupled to the closure body 120 and one or more standoff flanges 178 extending above the base substrate 176 in the +Z direction of the depicted coordinate axes. For example, there may be two or more standoff flanges 178 such as four standoff flanges 178. In some embodiments, a wire retention flange 179 may extend from one or more of the standoff flanges 178. The wire retention flange 179 may extend from a standoff flange 178 to retain wires within the primary volume 124. The standoff tray 175 may further have one or more tray retention tabs 182 (e.g., such as two or more tray retention flanges), which extend from the base substrate 176. As will be described in greater detail below, the one or more tray retention tabs 182 may be configured to extend through and/or engage the splice tray 191 to maintain a position of the splice tray 191 within the primary volume 124.

Figure 4A:
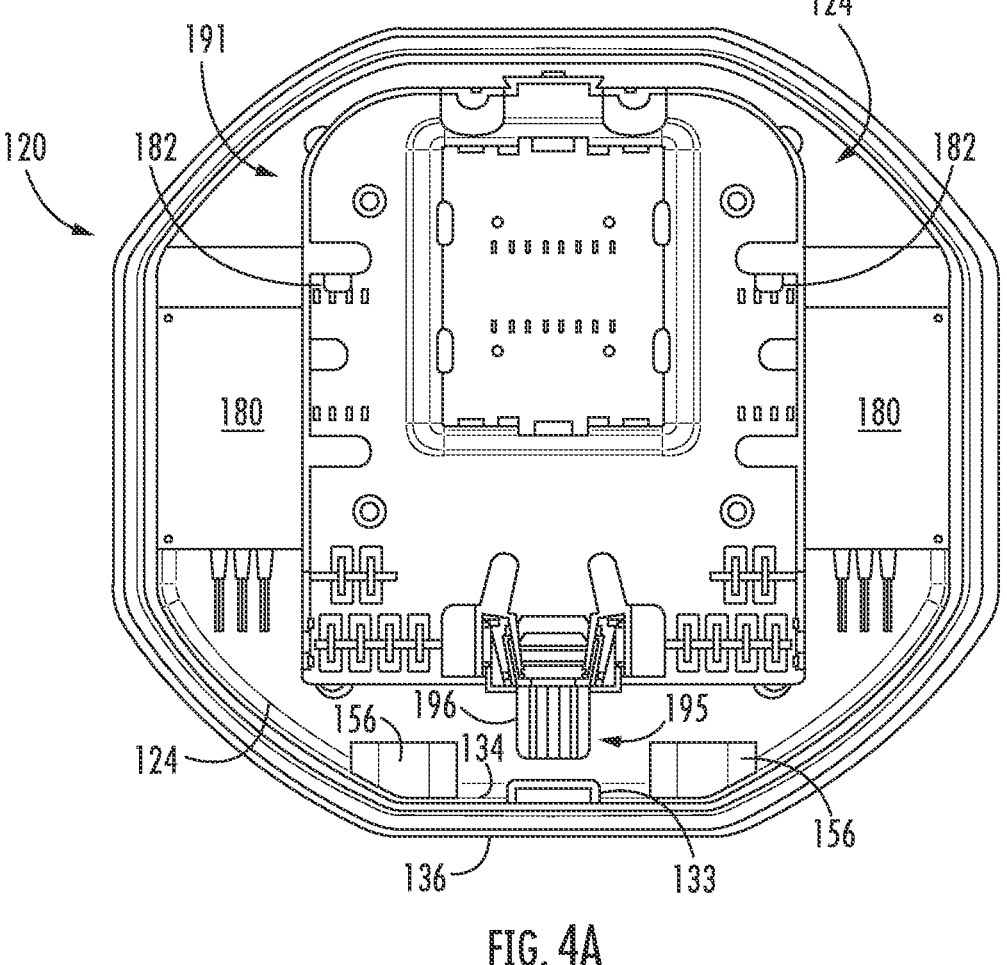
FIG. 4A depicts a top view of the interior of the fiber enclosure of FIG. 1A-1J with a splice tray coupled to the standoff tray, according to one or more embodiments shown and described herein.
Figure 4B:
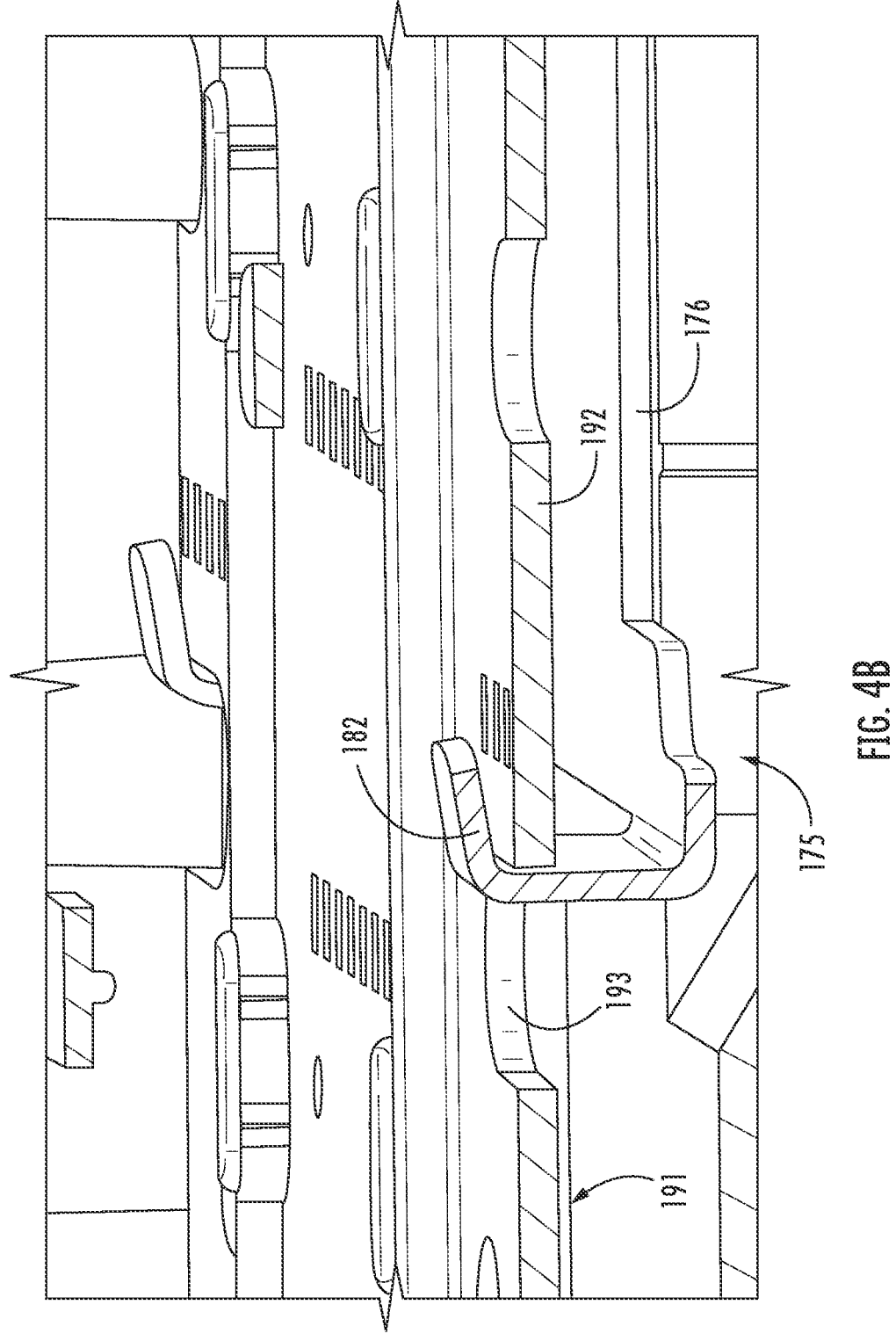
FIG. 4B depicts a cross-sectional view of the standoff tray coupled to the splice tray of FIG. 4A, according to one or more embodiments shown and described herein.
Figure 4C:
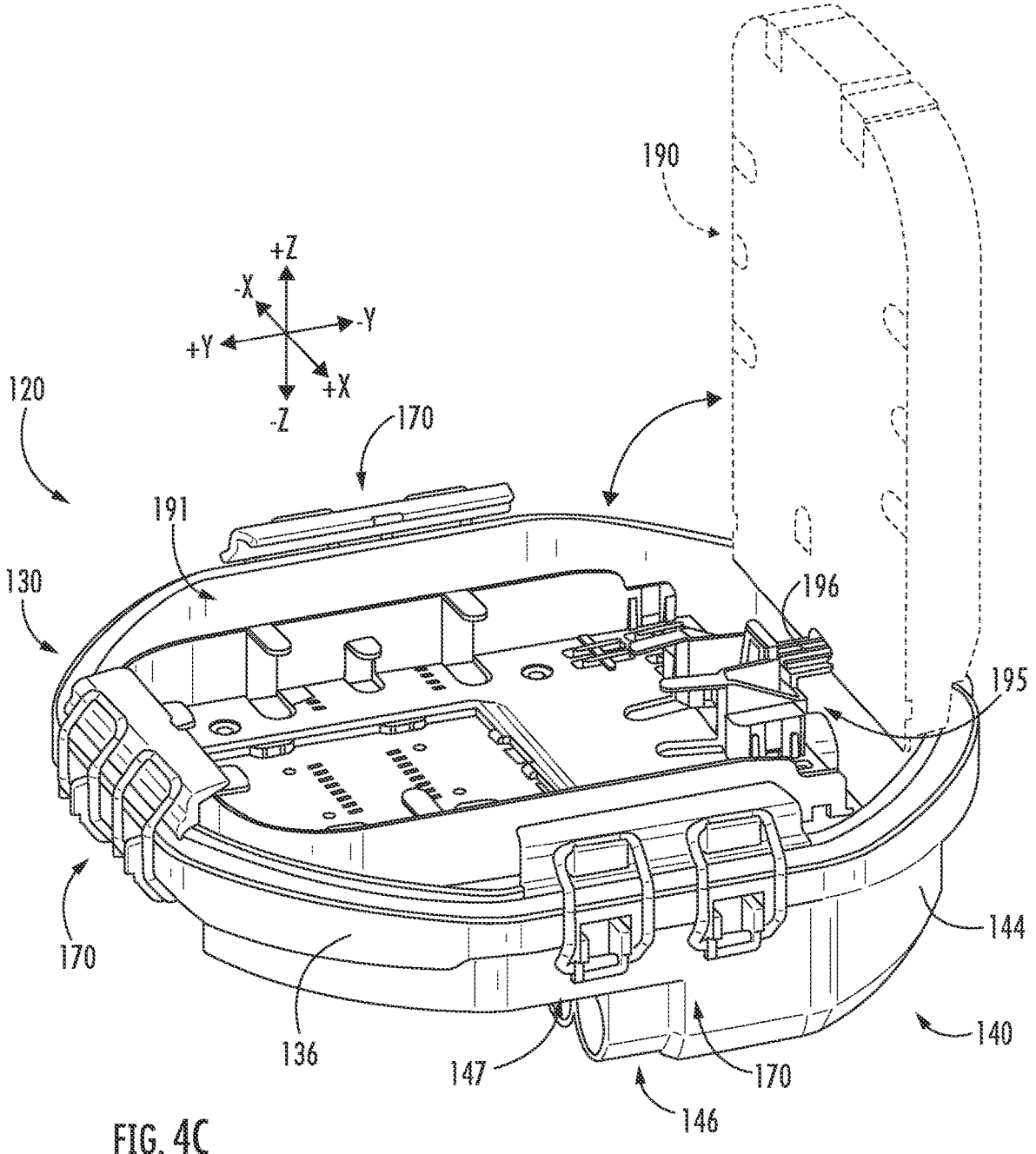
FIG. 4C depicts the splice tray of FIG. 4A moving from within a primary volume of the fiber enclosure, according to one or more embodiments shown and described herein.

Referring now to FIGS. 4A-4C, the closure body 120 is depicted with the splice tray 191 coupled thereto. The splice tray 191 may sit on the standoff flanges 178 so as to be spaced from the base substrate 176 of the standoff tray 175 in the +Z direction of the depicted coordinate axes, which may provide room to coil tubes and/or fibers from express fiber cables and/or drop cables. The splice tray 191 may be configured to hold and maintain spliced connections between one or more fibers of an express fiber cable 20 and one or more drop fiber cables 30. The splice tray 191 may include a tray body 192 and one or more tray openings 193 formed therein to receive the one or more tray retention tabs 182 of the standoff tray 175, thereby retaining a position of the splice tray within the primary volume. In some embodiments, the splice tray 191 may be coupled to the standoff tray 175 and/or the closure body 120 through one or more fasteners (not shown).

Referring to FIGS. 4A and 4C, coupled to the splice tray 191 may be a clip 195 comprising a tab 196 extending from the tray. The clip 195 may be coupled to the splice tray 191 or integrally formed therewith. In some embodiments, the outer edge wall 136, the inner edge wall 134, or both of the upper body portion 130 of the closure body 120 may define a clip port 133 such as a recess formed therein. The tab 196 of the clip 195 may be receivable within the clip port 133. Accordingly, as illustrated in FIG. 4C, when desired, such as when coiling wire slack within the fiber enclosure 110, the splice tray 191 may be lifted or rotated off the standoff tray 175 and the tab 196 is positioned within the clip port 133 to hold the splice tray 191 in an upright position when the splice tray 191 is moved from the primary volume 124. In some embodiments, it is contemplated that the splice tray 191 may instead be pivotally coupled to the closure body e.g., via a hinge connection.

Figure 5:
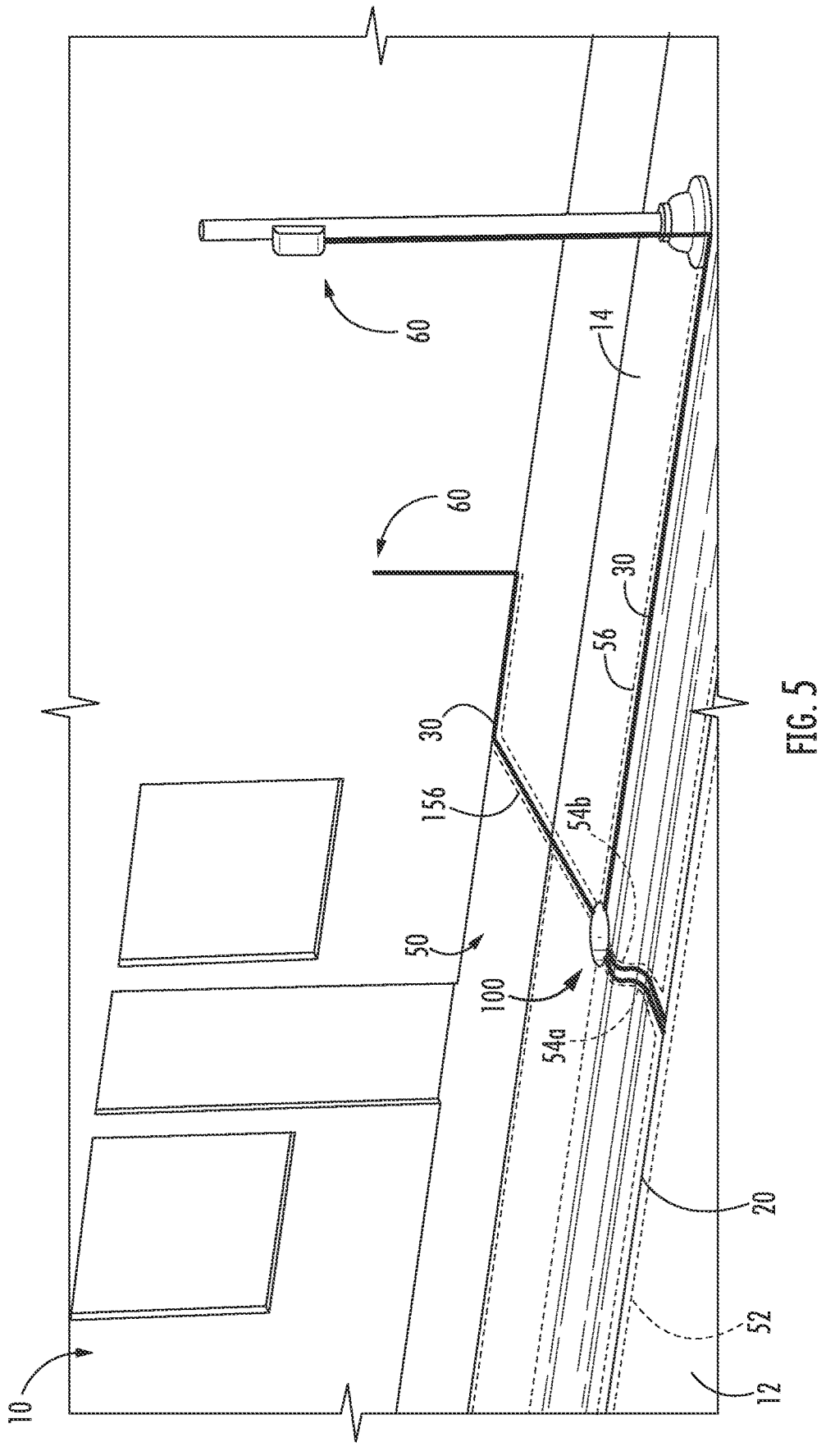
FIG. 5 schematically depicts a connective architecture including a fiber drop access point, according to one or more embodiments shown and described herein.

Referring now to FIG. 5, the various embodiments of the fiber enclosure 110 described above may be utilized as part of a connective architecture 10. The connective architecture 10 schematically indicates connections to and from a fiber drop access point 100 to allow for signals to be transmitted, for example, via fiber optics to houses, business, splitters, or the like. For example, the connected architecture 10, when directed to fiber optic connection, may generally include a express fiber cable 20, one or more drop fiber cables 30, one or more fiber drop access points 100, and one or more destinations 60 (e.g., houses, business, splitters, or the like). It is noted that a greater or fewer number of components may be included in the connective architecture 10 without departing from the scope of the present disclosure. Additionally, and as noted throughout in some embodiments, electrical cables may be routed to the fiber enclosure for forming electrical connections within the enclosure. Accordingly, in such embodiments, electrical cables may be routed to and/or from the fiber drop access point 100. The below description with respect to routing and/or connecting fiber optic cables to the fiber enclosure 110 applies to electrical cables unless otherwise stated or apparent.

As noted above, express fiber cable 20 refers to the main fiber cable that runs between adjacent fiber drop access points 100. Accordingly, the express fiber cable 20 may provide signals from a source (not shown) which may be transmitted to one or more destinations 60 via the one or more drop fiber cables 30 spliced or otherwise connected to the express fiber cable 20 at the fiber drop access point 100. In the connective architecture 10 there may be a plurality of fiber drop access points 100 in series (e.g., around a block, a neighborhood, business district, etc.) all of which provide a location for drop fiber cables 30 to be spliced to the express fiber cable 20.

In embodiments, the express fiber cable 20 and/or the plurality of drop fiber cables 30 may be routed underground, for example in trenches 50, to protect the fiber optic cables as well as to preserve environment esthetic. The trenches 50 may provide underground passages for routing the express fiber cable 20 to the fiber drop access point 100 and underground passages for routing the drop fiber cable(s) 30 to the destination 60. As noted above, a destination 60 may include a house, a business, a splitter, or any number of optical components. In the depicted embodiment, the plurality of trenches 50 includes a primary running line 52 within which the express fiber cable 20 may be positioned. For example, the primary running line 52 may be run along or within a street 12. The primary running line 52 may be formed via a saw sized to form a cut having a sufficient width and cutting depth to cut the primary running line 52 at a size sufficient to receive the express fiber cable 20. Extending laterally (e.g., toward a sidewalk 14) from the primary running line 52 may be an inlet lateral channel 54a and an outlet lateral channel 54b running from the primary running line 52 to the fiber drop access point 100. The inlet lateral channel 54a and the outlet lateral channel 54b may be formed via a saw sized to form a cut having a sufficient width and cutting depth to cut the inlet lateral channel 54a and the outlet lateral channel 54b at size sufficient to receive the express fiber cable 20. Accordingly the express fiber cable 20 may be routed into and out of the fiber drop access point 100. As will be described in greater detail herein, slack from the express fiber cable 20 may be stored within the fiber drop access point 100.

The plurality of trenches 50 may further include one or more drop fiber channels 56 extending from the fiber drop access point 100 toward the one or more destinations 60. The one or more drop fiber channels 56 may be formed via a saw sized to form a cut having a sufficient width and cutting depth to cut the one or more drop fiber channels 56 at size sufficient to receive a drop fiber cable 30. As will be described in greater detail herein, slack from the one or more drop fiber cables 30 may also be stored within the fiber drop access point 100.

Figure 6A:
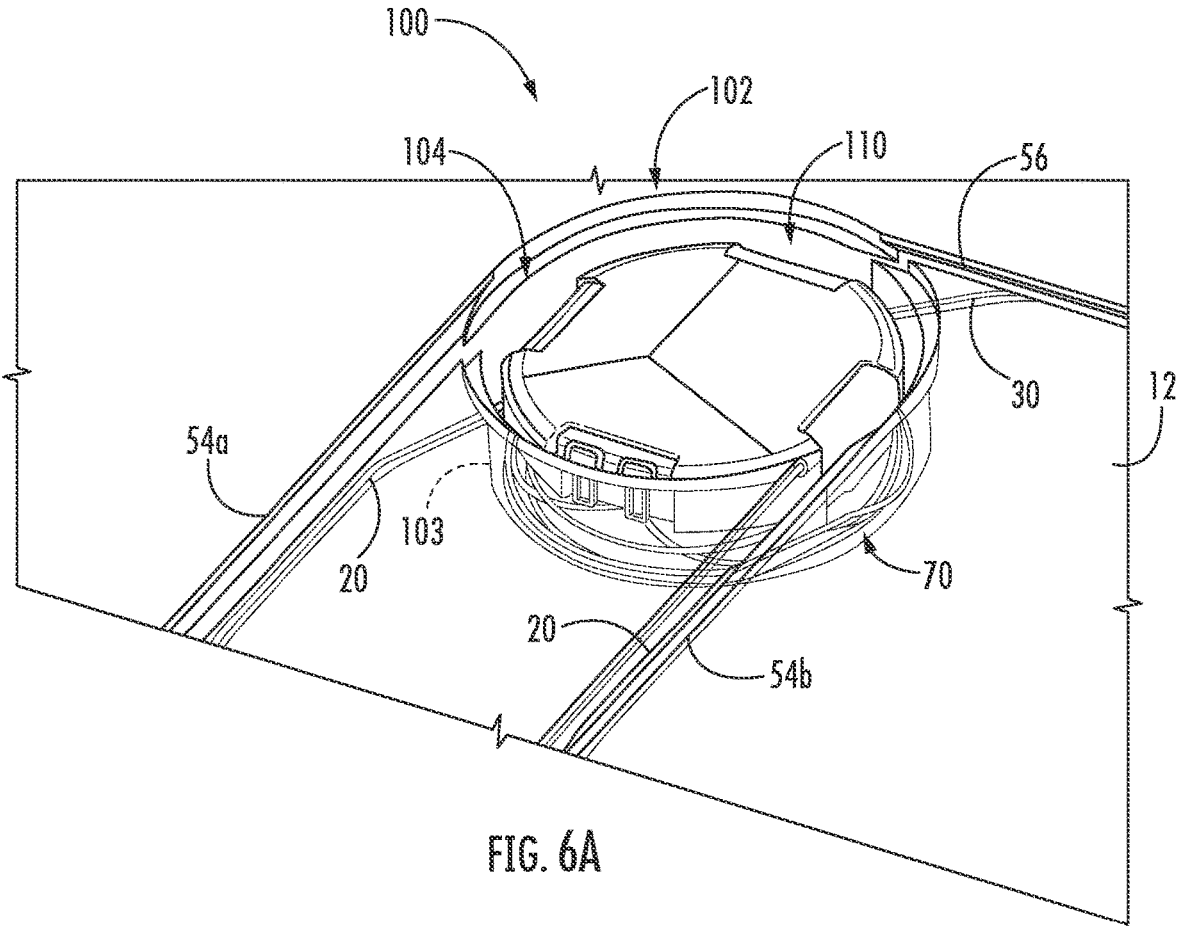
FIG. 6A depicts a perspective view of a vault with a fiber enclosure positioned therein, according to one or more embodiments shown and described herein.
Figure 6B:
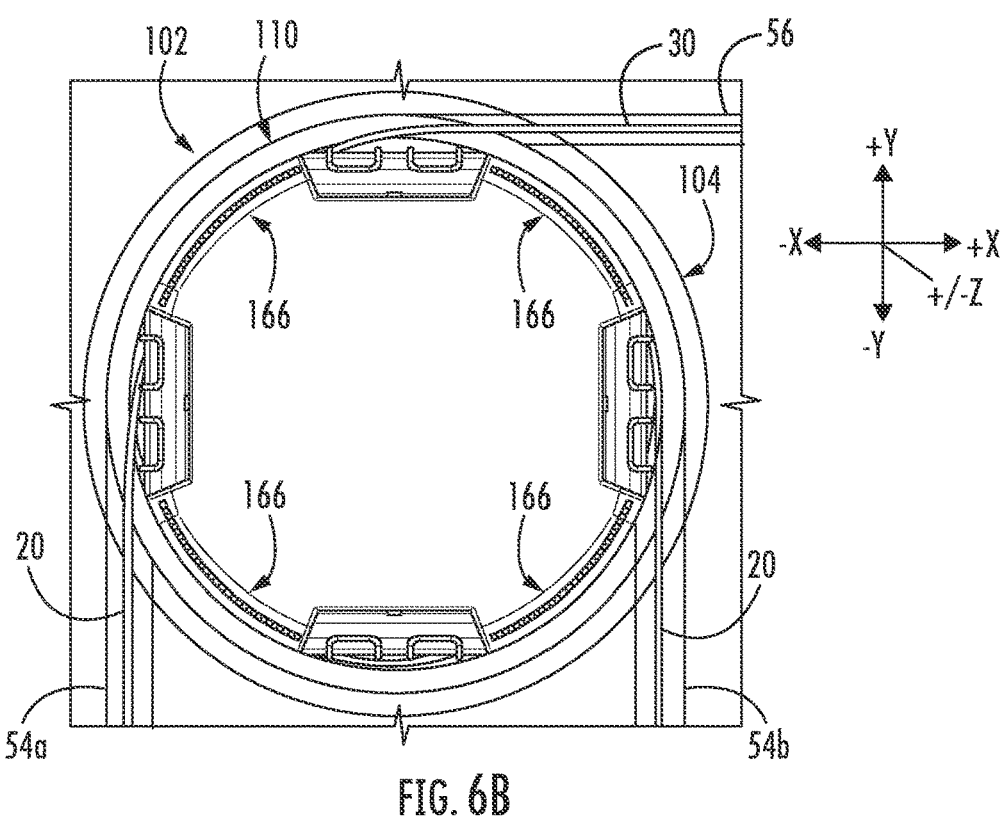
FIG. 6B depicts a top view of the vault and fiber enclosure of FIG. 6A, according to one or more embodiments shown and described herein.
Figure 6C:
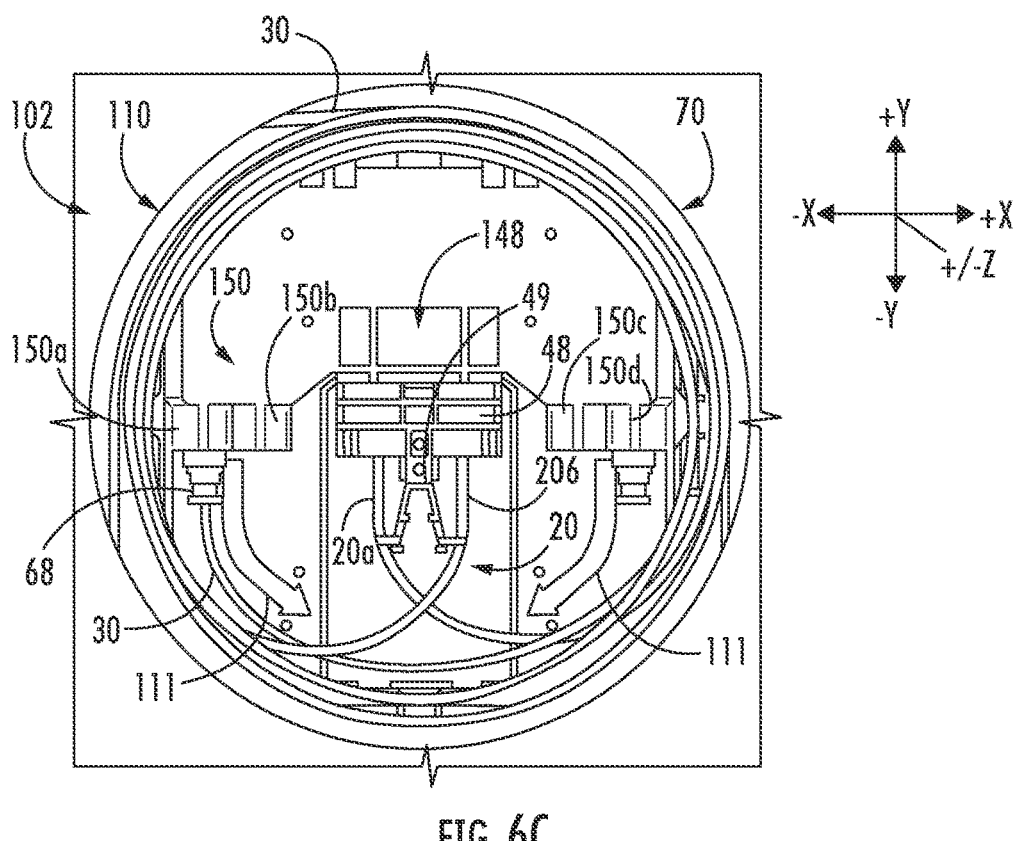
FIG. 6C depicts a bottom view of the vault and fiber enclosure of FIG. 6A, according to one or more embodiments shown and described herein.

Referring now to FIGS. 6A-6C, more detailed views of the fiber drop access point 100 are generally depicted. The fiber drop access point 100 may generally include a vault 102 and the fiber enclosure 110, according to any of the above-described embodiments, which may be removably positioned within the vault 102. To aid in winding the express fiber cable 20 and the one or more drop fiber cables 30 in a coil within the vault 102, the various channels (e.g., the inlet lateral channel 54a, the outlet lateral channel 54b, and/or the one or more drop fiber channels 56) extending into the vault 102 may extend into the vault 102 substantially tangential to a sidewall 103 of the vault 102. Accordingly, an entire diameter of the vault 102 may be used for bending the fiber optic cables into a coil. This allows the bend radius of the fiber optic cables to be maximized within the vault 102. By coiling the express fiber cable 20 and the one or more drop fiber cables 30, the express fiber cable 20 and the one or more drop fiber cables 30 may be neatly stored within vault 102 and a depth of the vault 102 may be limited, thereby decreasing excavation needs.

Figure 6D:
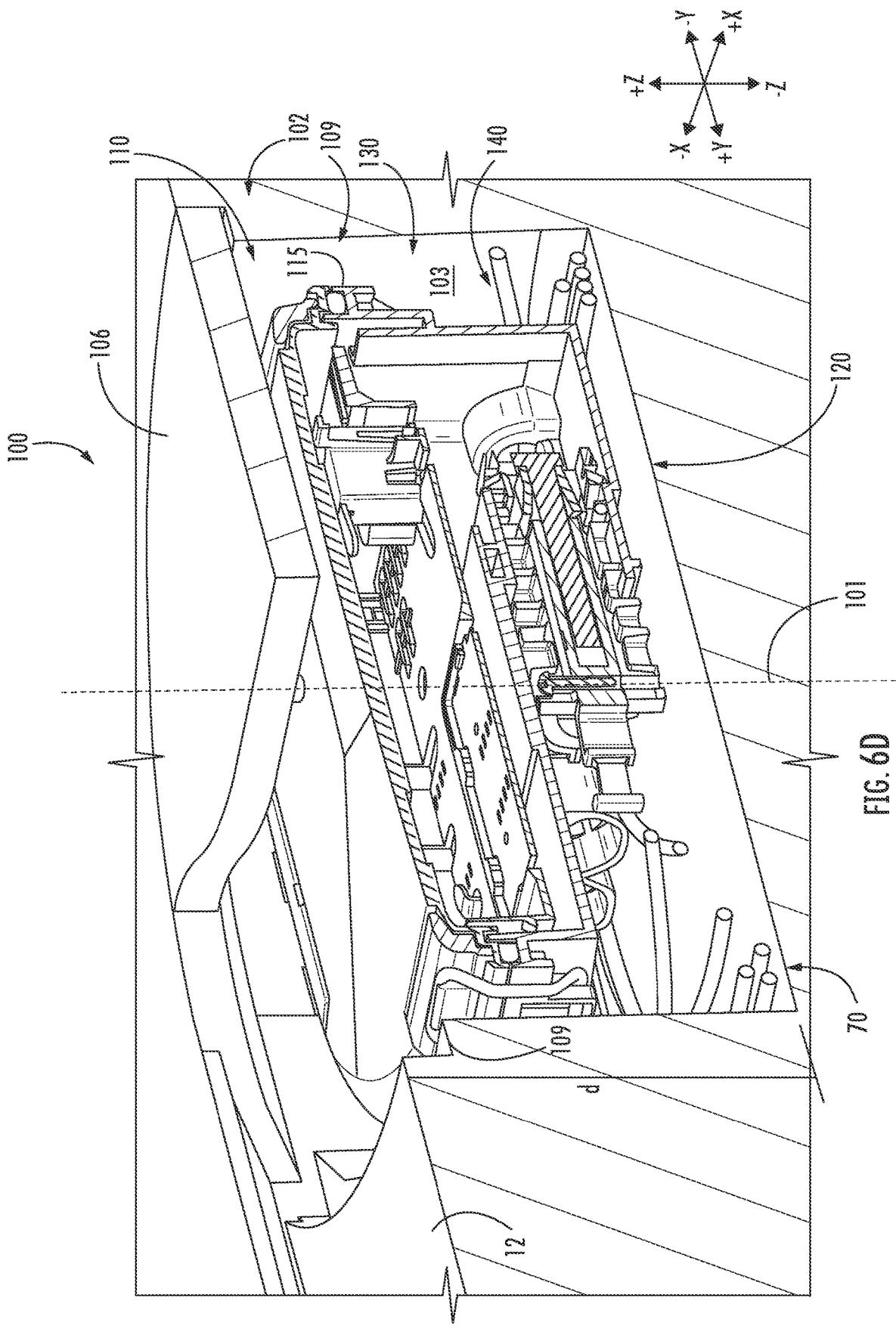
FIG. 6D depicts a cross section view of the fiber enclosure and vault of FIG. 6A including a vault lid, according to one or more embodiments shown and described herein.

Referring to FIG. 6D, a cross-section of the fiber drop access point 100 is schematically depicted. It is noted that the vault 102 may be formed directly within a surface such as a road 12, sidewalk 14 or the like. In embodiments, the vault 102 may have a round or circular cross-section in the XY plane of the depicted coordinate axes, though other shapes are contemplated and possible (e.g., square, rectangular, hexagonal, octagonal, or the like. The vault 102 may be formed through a variety of manufacturing processes such as through use of a hollow-centered core drill bit, such as where a round vault 102 is desired. In such embodiments, the surrounding road 12 and/or sidewalk 14 may form the sidewall 103 of the vault 102 without need for an additional container or liner. In embodiments, the vault 102 may be formed through the sidewalk 14 and/or pavement to the soil and/or rocks beneath.

The vault 102 defines a vault volume 104 sized to receive the fiber enclosure 110. The vault 102 may further include a vault lid 106 (e.g., reinforced concrete, steel or the like) sized and shaped to be selectively positioned to enclose the vault volume 104 and the fiber enclosure 110 within the vault volume 104. A countersunk lip 109 may extend along a sidewall 103 of the vault 102 and provide an interface to receive the vault lid 106, which may allow the vault lid 106 to be recessed into the pavement or concrete such that a transition from a surface of the sidewalk 14 or pavement to the vault lid 106 is substantially smooth. For example, the countersunk lip 109 may be recessed about 1" from the surface to receive the vault lid 106, though other depths are contemplated and possible.

In some embodiments, it is contemplated that the lid 160 of the fiber enclosure 110 may be coupled to the vault lid 106, such that removable of the vault lid 106, removes the fiber enclosure 110 from the vault 102. For example, the vault lid 106 may be coupled to the lid 160 of the fiber enclosure 110 through any number of fasteners, adhesives, clamps, or the like. By coupling the lid 160 to the vault lid 106, the fiber enclosure 110 may be suspended above a bottom of the vault, thereby keeping the fiber enclosure 110 positioned away from dirt or other contaminates. In some embodiments, the vault lid 106 and the lid 160 of the fiber enclosure may be integral with one another.

The vault 102 may have a variety of dimensions. However, in at least one embodiment, the depth d of the vault 102 may be less than about 10" (e.g., about 8" or less, about 6" or less, about 4" or less, or the like). The vault 102 may further have a diameter of less than about 24" (such as about 20" or less, about 16" or less, about 12" or less, or the like). In embodiments, the vault 102 may be sized to correspond to a dimension the fiber enclosure 110 and configured to receive the fiber enclosure 110 and a slack 70 of the express fiber cable 20 and one or more drop fiber cables 30 wound beneath the fiber enclosure 110. For example, when assembled a common axis 101 may extend through approximately a center of the vault 102, the fiber enclosure 110 and the wound slack 70. For example, in some embodiments, the fiber enclosure 110 may take up about 20% to about 80% of the vault volume 104, such as between about 40% and about 60%, such as between about 43% and about-56% of the vault volume 104, or the like. In some embodiments, the volume of the enclosure 110 and the volume of any cable slack stored therein may be take up about 30% to about 90% of the vault volume 104, such as between about 45% and about 65%, such as between about 47% and about-60% of the vault volume 104, or the like.

It is noted that the fiber enclosure 110 may be sized and shaped to fit within the vault 102, such that the edge 115 of the fiber enclosure 110 is positioned adjacent and extends alongside the sidewall 103 of the vault 102. Stated another way, the fiber enclosure 110 substantially fills a cross-section of the vault 102 when viewed along the Z direction of the depicted coordinate axes. For example, the fiber enclosure 110 may be sized and shaped to fit within the vault 102 while minimizing a clearance between the vault 102 sidewall 103 and the outer edge 115 of the fiber enclosure 110. For example, and as described above, the fiber enclosure 110 may have a substantially round or octagonal shape which may provide the fullest use of space within the vault 102.

To aid in removal of the fiber enclosure 110 from the vault, the edges of the fiber enclosure 110 may be more linear where the clamps 170 are located. Accordingly there may be more clearance between the sidewall 103 of the vault 102 and the fiber enclosure 110 at the clamps 170 than at positions between the adjacent clamps 170. This may allow a user to put their fingers or a tool between an edge of the clamps 170 of the fiber enclosure 110 and the sidewall 103 of the vault 102 to easily remove the fiber enclosure 110 from the vault 102 when needed.

Referring again to FIGS. 6A-6C, the fiber enclosure 110 is depicted positioned within the vault 102. In the depicted embodiment the express fiber cable 20 is coupled to the express fiber cable port 148, and a drop fiber cable 30 is coupled to a drop cable port 150a of the plurality of drop cable ports 150. As described above, the express fiber cable port 148 may be larger than the plurality of drop cable ports 150. This may allow for a single express fiber cable port 148 to provide an inlet location and an outlet location for the express fiber cable 20. For example, the express fiber cable 20 may be coupled to a double external cable assembly module (ECAM) entry port and sealing grommet assembly 48 may be inserted into the express fiber cable port 148. The double ECAM and sealing grommet assembly 48 may include one or more detents (not shown), which allow the double ECAM to snap into and secure itself to the express fiber cable port 148. The double ECAM entry port and sealing grommet assembly 48 may provide a fluid tight seal around the express fiber cable 20. Similarly, each of the one or more drop fiber cables 30 may extend into the one or more drop cable ports 150 through a single ECAM and sealing grommet assembly 68. The single ECAM and sealing grommet assembly 68 may include one or more detents (not shown), which allow the single ECAM to snap into and secure itself to the drop cable port 150a.

Referring specifically to FIG. 6C, the fiber enclosure 110 is positioned within the vault 102 with the express fiber cable 20 extending into and out of the fiber enclosure 110 at the express fiber cable port 148 and a drop fiber cable 30 coupled to one a drop cable port 150a. As depicted, the double ECAM and sealing grommet assembly 48 may include an anchor extension 49, which may be coupled to an inlet side 20a of the express fiber cable 20 where the express fiber cable 20 enters the fiber enclosure 110 and the outlet side 20b of the express fiber cable 20 where the express fiber cable 20 exits the fiber enclosure 110. The inlet side 20a and the outlet side 20b may be cross over one another proximate to the double ECAM and sealing grommet assembly such that the express fiber cable 20 crosses itself, which may aid in guiding and efficiently coiling the slack 70 of the express fiber cable 20 beneath the fiber enclosure 110. For example by crossing the inlet side 20a and the outlet side 20b over one another, the beginning bend radius of a loop is started, thereby encouraging and directing coiling, and preventing the express fiber cable 20 from needing to change a coiling direction (e.g., creating an "s" bend).

It is noted the drop cable port selection may be important with respect to a direction the drop fiber cable 30 enters the vault 102 for efficient coiling and to avoid making an "s" bend to change coiling direction. For example, and as illustrated in FIG. 6B, the drop fiber cable 30 enters the vault 102 from the right when view the vault 102 along the −Z direction of the depicted coordinate axes, in this case. Accordingly, as the drop fiber cable 30 tangentially enters the vault 102 the drop fiber cable 30 can continue following the curved sidewall 103 of the vault 102 in a counterclockwise direction. As depicted in FIG. 6C, viewing the vault 102 along the +Z direction of the depicted coordinate axes, the drop cable ports 150a, 150b located to the left of the express fiber cable port 148 provides a natural location to mount the drop fiber cable 30 without needing to change the direction of coil of the drop fiber cable 30. Accordingly, the "s" bend noted above can be avoided. It is contemplated that in embodiments, indicia 111 instructing a user on the direction of coil may be provided (e.g., stamped, printed, molded, or the like) on the fiber enclosure 110.

Figure 7:
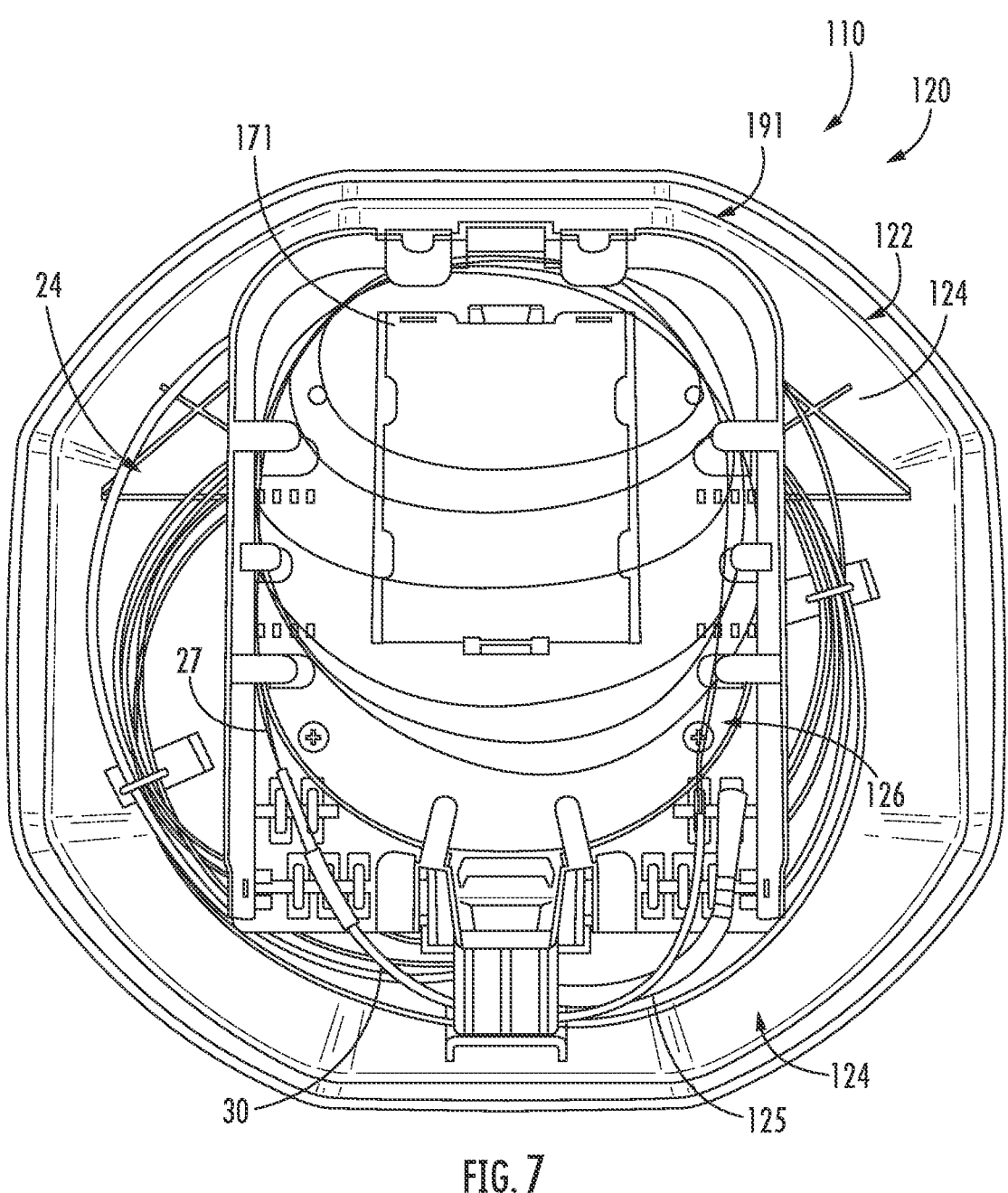
FIG. 7 depicts an internal view of the fiber enclosure including a plurality of splices positioned therein, according to one or more embodiments shown and described herein.

In embodiments where optical fibers are spliced to one another, the portion of the express fiber cable 20 which extends into the fiber enclosure 110 may be stripped of an outer casing, exposing the plurality of tubes 24 depicted in FIG. 7, which extend from the inlet volume 126 and into the primary volume 124 where the plurality of tubes 24 may be coiled and await splicing. During splicing a desired tube 25 of the express fiber cable 20 may then be routed to the splice tray 191 where it is stripped to expose the individual fibers 26. Similarly, the drop fiber cable 30 may be enter the fiber enclosure 110 through the inlet volume 126 and be routed into the primary volume 124 by coiling the drop fiber cable 30 from the drop cable port around the fiber enclosure 110 to the splice tray 191 wherein the drop fiber cable 30 may be stripped to expose the individual fibers 27 of the drop fiber cable 30. Accordingly fibers of the drop fiber cable 30 and the desired tube 25 may be spliced together and held by the splice tray 191. The remaining tubes 24 may be left unstripped and uncut. Accordingly, such tubes 24 may continue uninterrupted out of the fiber enclosure 110 via the express fiber cable 20 to the next splice location and so on and so forth. In some embodiments, the splice tray 191 may include a mezzanine 171, which may enclose spliced connections held by the splice tray 191. It is noted that the, the round or octagonal geometry of the fiber enclosure 110 allows for full internal diameter tubes and fibers, which reduces tight bend radiuses within and the fiber enclosure 110.

Figure 10:
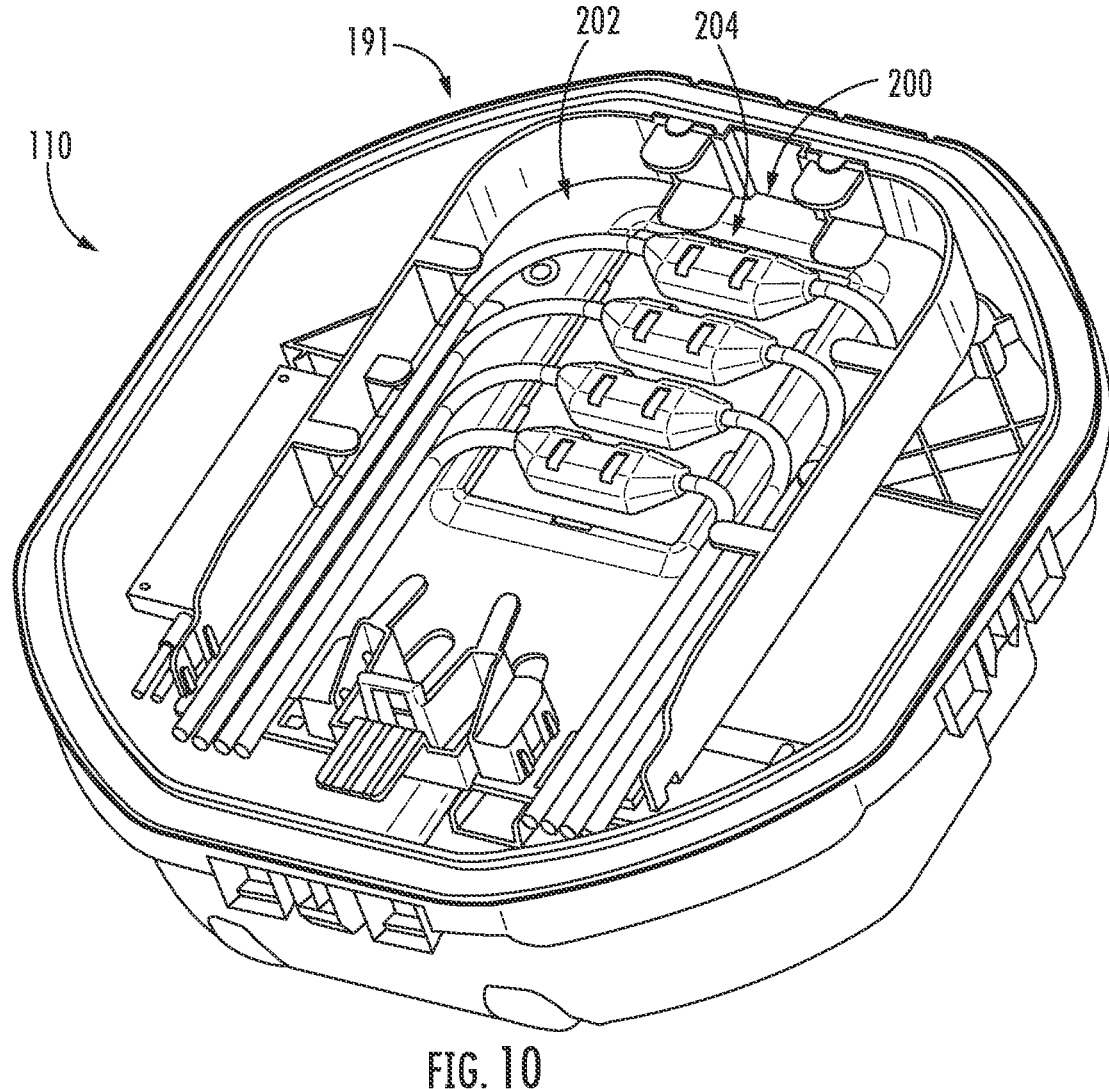
FIG. 10 depicts a fiber enclosure having one or more electrical connections formed therein, according to one or more embodiments shown and described herein.

It is noted that in some embodiments, electrical cables may be similarly routed to the fiber enclosure and connected to one another (e.g., via splicing or through other electrical connections). For example, FIG. 10 depicts an embodiment of the fiber enclosure 110 housing electrical splices 200. For example, electrical wires 202 may be spliced together with one or more connectors 204, such as that the COOLSPLICE connector, commercially available from TE CONNECTIVITY. However, other configurations are contemplated and possible without departing from the scope of the present disclosure.

Figure 8:
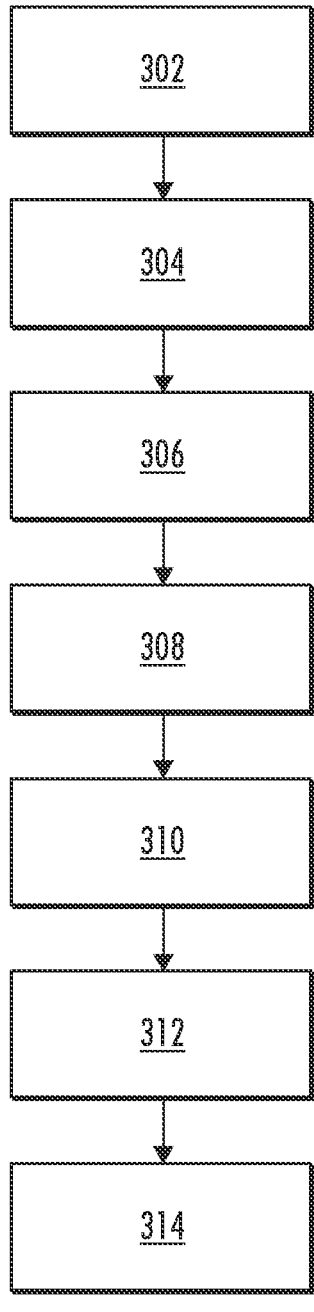
FIG. 8 depicts a flow chart illustrating a method for installing a fiber drop access point, according to one or more embodiments shown and described herein.

FIG. 8 depicts a flowchart illustrating a method 300 for installing a fiber drop access point 100 according to the present disclosure. It is noted that a greater or fewer number of steps, taken in any order, may be included without departing from the scope of the present disclosure. In particular, the method 300 may include at block 302, coupling one or more cables to the plurality of ports. For example, the method 300 may include coupling the express fiber cable 20 to the express fiber cable port 148 of the fiber enclosure 110, as described above. In particular, and as noted above, the express fiber cable port 148 is recessed from an outer edge 132 of the upper body portion 130. Accordingly, because of the recess, a portion of the width of the fiber enclosure 110 may be used in bending and coiling the slack 70, allowing the slack 70 to be wound substantially within a footprint of the fiber enclosure 110 and/or the vault 102. Accordingly, a block 304 the method 300 may include winding the slack 70 of the cable (e.g., the express fiber cable 20) within the vault 102, such that the wound slack 70 substantially corresponds to a footprint of the fiber enclosure 110. It is noted that "substantially correspond" as used herein generally refers to the cable being substantially within the diameter and/or width of the closure body 120, for example, wound slack diameters may be within about 20 cm or less, such as within about 10 cm or less of a diameter of the closure body 120.

Figure 9:
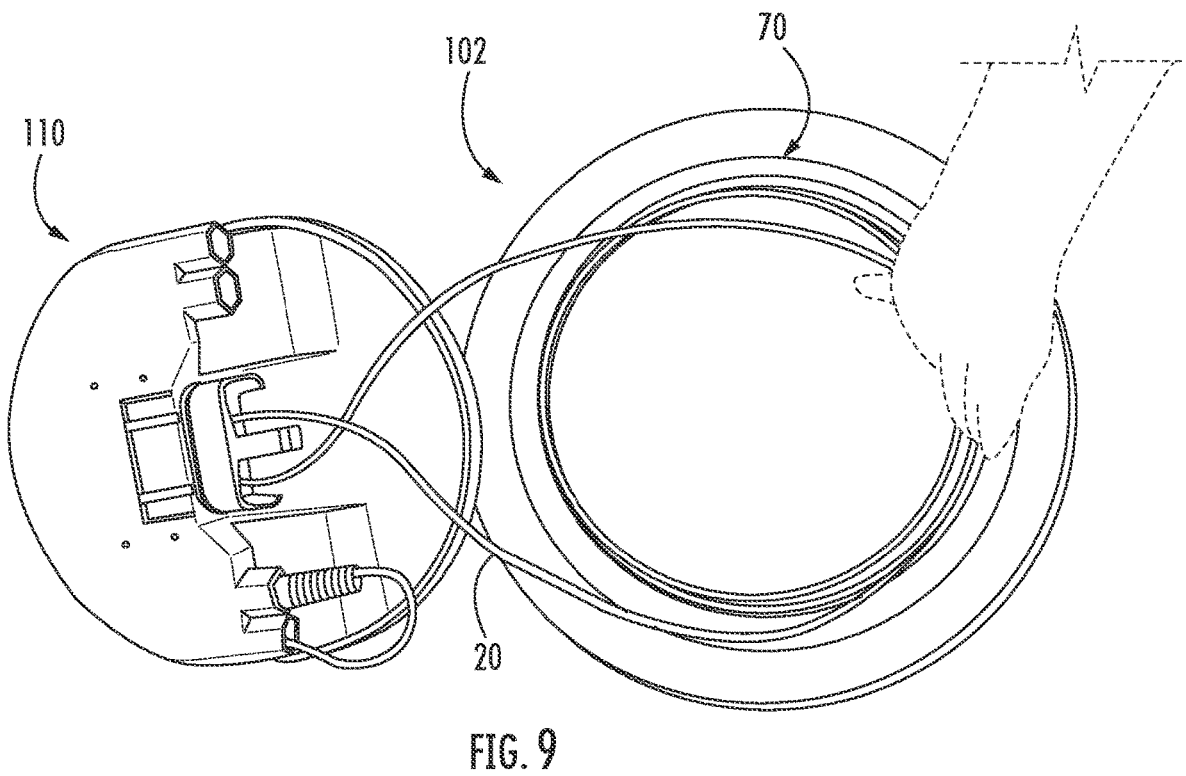
FIG. 9 depicts an individual installing a fiber drop access point, according to one or more embodiments shown and described herein.

FIG. 9 depicts a user winding slack 70 within a vault 102. As depicted, the express fiber cable 20 is coupled to the express fiber cable port 148. The user may have the fiber enclosure 110 positioned top side down during fiber enclosure installation. Once the slack 70 is wound within the vault 102, the fiber enclosure 110 may be flipped over, top side up, as depicted in FIGS. 6A-6C, and positioned within the vault 102 on top of the slack 70.

Referring again to FIG. 8, the method 300 may continue with installation a second cable such as the drop fiber cable 30 at block 306 by coupling a drop fiber cable 30 to one of the plurality of drop cable ports 150. For example, installing the drop fiber cable 30 may include choosing a drop port based on the direction of rotation of the drop fiber cable 30 as is enters the vault 102. For example, clockwise rotation may cause the drop fiber cable 30 to attach to a drop cable port 150 on the left side of the closure, while counterclockwise rotation may cause the drop fiber cable 30 to attach to a drop cable port 150 on the right side of the fiber enclosure 110. Accordingly, forming an "s" bend may be avoided. At block 308 the method 300 may include winding a slack 70 of the one or more drop fiber cable 30 within the vault 102 to substantially correspond to a footprint of the fiber enclosure 110.

In embodiments, the method 300 may include at block 310 coupling the lid 160 to the closure body 120. As noted herein above, the lid 160 may be coupled to the closure body 120 through a plurality of clamps 170. However, in further embodiments, the lid 160 may be coupled to the closure body 120 through a threaded connection, for example, or a combination of a threaded connection and one or more clamps 170. At block 314, one or more spliced connections may be formed between the express fiber cable 20 and the one or more drop cables 30 within the fiber enclosure as described above. At block 312, the method 300 includes placing the fiber enclosure 110 within the vault 102 and securing the vault lid 106 over the vault 102 to enclose the fiber enclosure 110 and slack 70 within the vault 102. In some embodiments, the vault lid 106 may then be placed in position to await addition of a drop fiber. It is noted in some embodiments, the method may include coupling the lid 160 to the vault lid (e.g., via a combination fasteners, adhesives, welding, etc.).

Embodiments of the present disclosure may be further described by the following numbered clauses:

1. A fiber enclosure comprising an upper body portion and a lower body portion coupled to the upper body portion, wherein: the upper body portion defines a primary volume; the lower body portion extends from the upper body portion and defines an inlet volume in communication with the primary volume, the lower body portion comprising a port wall comprising a plurality of ports for receiving cables; and the port wall is recessed from an outer edge of the upper body portion, such that the plurality of ports is positioned in a separate plane from the upper body portion and recessed from the outer edge of the upper body portion a distance larger than or equal to a bend radius of a cable connected thereto.

2. The fiber enclosure of clause 1, further comprising a standoff tray mounted to the upper body portion within the primary volume.

3. The fiber enclosure of any preceding clause, further comprising a splice tray mounted to the standoff tray, wherein the standoff tray comprise one or more tray retention tabs, the one or more tray retention tabs extending through the splice tray such that a position of the splice tray is retained within the primary volume.

4. The fiber enclosure of any preceding clause, further comprising a splice tray mounted to the upper body portion within the primary volume, wherein: the outer edge of the upper body portion defines a clip port; the splice tray comprises a clip comprising a tab; and the tab is receivable within the clip port to hold the splice tray in an upright position when the splice tray is moved from the primary volume.

5. The fiber enclosure of any preceding clause, further comprising a lid and a plurality of clamps configured to secure the lid to the upper body portion.

6. The fiber enclosure of any preceding clause, wherein: the plurality of ports comprises a plurality of drop cable ports and an express fiber cable port; and the plurality of drop cable ports is positioned substantially in line with the express fiber cable port such that a common plane extends through the plurality of drop cable ports and the express fiber cable port.

7. The fiber enclosure of any preceding clause, wherein the express fiber cable port is sized to receive a double external cable assembly module (ECAM) and sealing grommet assembly.

8. The fiber enclosure of any preceding clause, wherein the upper body portion comprises a substantially octagonal shape.

9. The fiber enclosure of any preceding clause, wherein the plurality of ports is positioned to allow slack extending external to the fiber enclosure to be wound substantially within a footprint of the fiber enclosure.

10. A fiber drop access point comprising a vault and a fiber enclosure positioned within the vault, wherein: the vault defines a vault volume sized to receive the fiber enclosure; the fiber enclosure comprises an upper body portion and a lower body portion coupled to the upper body portion; the upper body portion defines a primary volume; the lower body portion extends from the upper body portion and defines an inlet volume in communication with the primary volume, the lower body portion comprising a port wall comprising a plurality of ports; and the port wall is recessed from an outer edge of the upper body portion, such that the plurality of ports is positioned in a separate plane from the upper body portion and recessed from the outer edge of the upper body portion a distance larger than or equal to a bend radius of a cable connected thereto.

11. The fiber drop access point of any preceding clause, further comprising an inlet lateral channel, an outlet lateral channel, and one or more drop fiber channels in communication with the vault, an express fiber cable, and one or more drop fiber cables, wherein: the plurality of ports comprises a plurality of drop cable ports and an express fiber cable port; the express fiber cable is positioned within the inlet lateral channel, extends into the vault volume where the express fiber cable enters the fiber enclosure at the express fiber cable port, exits the fiber enclosure, and extends into the outlet lateral channel; the one or more drop fiber cables extend from one or more drop cable ports of the plurality of drop cable ports through the one or more drop fiber channels; and a slack of the express fiber cable and the one or more drop fiber cables is wound enclosure substantially within a foot print of the fiber enclosure.

12. The fiber drop access point of any preceding clause, wherein the vault comprises a circular cross-section that substantially corresponds to a dimension of the upper body portion of the fiber enclosure.

13. The fiber drop access point of any preceding clause, further comprising a double external cable assembly module (ECAM) and sealing grommet assembly positioned within the express fiber cable port, wherein the express fiber cable enters and exits the fiber enclosure through the double ECAM and sealing grommet assembly, the express fiber cable crosses itself at a position proximate the double ECAM and sealing grommet assembly and is held in the position via an anchor extending from the double ECAM and sealing grommet assembly.

14. The fiber drop access point of any preceding clause, wherein the fiber enclosure further comprises a standoff tray mounted to the upper body portion within the primary volume.

15. The fiber drop access point of any preceding clause, wherein the fiber enclosure further comprises a splice tray mounted to the standoff tray, wherein: the standoff tray comprises one or more tray retention tabs, the one or more tray retention tabs extending through the splice tray such that a position of the splice tray is retained within the primary volume.

16. The fiber drop access point of any preceding clause, wherein the fiber enclosure further comprises a splice tray mounted to the upper body portion within the primary volume, wherein: the outer edge of the upper body portion defines a clip port; the splice tray comprises a clip comprising a tab; and the clip is receivable within the clip port to hold the splice tray in an upright position when the splice tray is moved from the primary volume.

17. The fiber drop access point of any preceding clause, wherein the fiber enclosure further comprises a lid and a plurality of clamps configured to secure the lid to the upper body portion.

18. The fiber drop access point of any preceding clause, wherein: the plurality of ports comprises a plurality of drop cable ports and an express fiber cable port; and the plurality of drop cable ports is positioned substantially in line with the express fiber cable port such that a common plane extends through the plurality of drop cable ports and the express fiber cable port.

19. The fiber drop access point of any preceding clause, wherein the express fiber cable port is sized to receive a double external cable assembly module (ECAM) and sealing grommet assembly.

20. The fiber drop access point of any preceding clause, wherein the upper body portion comprises a substantially octagonal shape.

21. The fiber drop access point of any preceding clause, further comprising a lid configured to enclose the fiber enclosure within the vault volume.

22. The fiber drop access point of any preceding clause, wherein each of the plurality of ports is configured to receive at least one of a single optical connector or a multi-fiber optical connector.

23. A method of installing a fiber drop access point, comprising: coupling a cable to a port of a fiber enclosure, the fiber enclosure comprising an upper body portion and a lower body portion coupled to the upper body portion, wherein the lower body portion comprises a port wall comprising a plurality of ports and the port wall is recessed from an outer edge of the upper body portion, such that the plurality of ports is positioned in a separate plane from the upper body portion and recessed from the outer edge of the upper body portion a distance larger than or equal to a bend radius of the cable; winding a slack of the cable within a vault formed within a surface, wherein the wound slack substantially corresponds to a footprint of the fiber enclosure; and placing the fiber enclosure within the vault.

24. The method of any preceding clause, further comprising coupling a lid of the fiber enclosure to a vault lid.

25. The method of any preceding clause, further comprising securing the vault lid over the vault to enclose the fiber enclosure within the vault.

26. The method of any preceding clause, further comprising: coupling a second cable to another of the plurality of ports; and splicing one or more fibers of the cable with one or more fibers of the second cable.

27. A fiber enclosure comprising an upper body portion and a lower body portion coupled to the upper body portion, wherein: the upper body portion defines a primary volume; the lower body portion extends from the upper body portion and defines an inlet volume in communication with the primary volume, the lower body portion comprising a port wall comprising a plurality of ports for receiving cables; and the port wall is recessed from an outer edge of the upper body portion, such that the plurality of ports is positioned in a separate plane from the upper body portion and recessed from the outer edge of the upper body portion.

28. The fiber enclosure of any preceding clause, further comprising a standoff tray mounted to the upper body portion within the primary volume.

29. The fiber enclosure of any preceding clause, further comprising a splice tray mounted to the standoff tray, wherein: the standoff tray comprise one or more tray retention tabs, the one or more tray retention tabs extending through the splice tray such that a position of the splice tray is retained within the primary volume.

30. The fiber enclosure of any preceding clause, further comprising a splice tray mounted to the upper body portion within the primary volume, wherein: the outer edge of the upper body portion defines a clip port; the splice tray comprises a clip comprising a tab; and the tab is receivable within the clip port to hold the splice tray in an upright position when the splice tray is moved from the primary volume.

31. The fiber enclosure of any preceding clause, further comprising a lid and a plurality of clamps configured to secure the lid to the upper body portion.

32. The fiber enclosure of any preceding clause, wherein: the plurality of ports comprises a plurality of drop cable ports and an express fiber cable port; and the plurality of drop cable ports is positioned substantially in line with the express fiber cable port such that a common plane extends through the plurality of drop cable ports and the express fiber cable port.

33. The fiber enclosure of any preceding clause, wherein the express fiber cable port is sized to receive a double external cable assembly module (ECAM) and sealing grommet assembly.

34. The fiber enclosure of any preceding clause, wherein the upper body portion comprises a substantially octagonal shape.

35. The fiber enclosure of any preceding clause, wherein the plurality of ports is positioned to allow slack extending external to the fiber enclosure to be wound substantially within a footprint of the fiber enclosure.

It should now be understood that embodiments as disclosed herein are directed to fiber enclosures, fiber drop access points, and methods for installing fiber drop access points having lower profiles and less excavation are disclosed herein. In particular, the embodiments provide improved, lower depth fiber drop access points, that allow for slack wires to be wound within a footprint of a closure device, thereby allowing for more compact fiber drop access points requiring less excavation. In particular embodiments, a fiber enclosure includes an upper body portion and a lower body portion coupled to the upper body portion. The upper body portion defines a primary volume and the lower body portion extends from the upper body portion and defines an inlet volume in communication with the primary volume. The lower body portion includes a port wall comprising an express a plurality of ports. The port wall is recessed from an outer edge of the upper body portion, such that the plurality of ports is positioned in a separate plane from the upper body portion and recessed from the outer edge of the upper body portion a distance larger than or equal to a bend radius of a cable connected thereto. Accordingly, the express fiber cable port and the plurality of drop cable ports may be positioned within a separate plane from the primary volume which may allow for smaller profile fiber enclosures as well as improved slack winding.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A fiber enclosure, comprising:
an upper body portion and a lower body portion coupled to the upper body portion, wherein:
the upper body portion defines a primary volume;
the lower body portion extends from the upper body portion and defines an inlet volume in communication with the primary volume, the lower body portion comprising a port wall having a plurality of ports for receiving cables; and
a splice tray mounted to the upper body portion within the primary volume, wherein:
the outer edge of the upper body portion defines a clip port;
the splice tray comprises a clip comprising a tab; and
the tab is receivable within the clip port to hold the splice tray in an upright position when the splice tray is moved from the primary volume,
wherein the port wall is recessed from an outer edge of the upper body portion such that the plurality of ports is positioned in a separate plane from the upper body portion and recessed from the outer edge of the upper body portion a distance larger than or equal to a bend radius of a cable connected thereto.

2. The fiber enclosure of claim 1, further comprising a standoff tray mounted to the upper body portion within primary volume.

3. The fiber enclosure of claim 1, further comprising a splice tray mounted to the standoff tray, wherein:
the standoff tray comprises one or more tray retention tabs, the one or more tray retention tabs extending through the splice tray such that a position of the splice tray is retained within the primary volume.

4. The fiber enclosure of claim 1, further comprising a lid and a plurality of clamps configured to secure the lid to the upper body portion.

5. The fiber enclosure of claim 1, wherein:
the plurality of ports comprises a plurality of drop cable ports and an express fiber cable port; and
the plurality of drop cable ports is positioned substantially in line with the express fiber cable port such that a common plane extends through the plurality of drop cable ports and the express fiber cable port.

6. The fiber enclosure of claim 1, wherein the express fiber cable port is sized to receive a double external cable assembly module and sealing grommet assembly.

7. The fiber enclosure of claim 1, wherein the upper body portion comprises a substantially octagonal shape.

8. The fiber enclosure of claim 1, wherein the plurality of ports is positioned to allow slack extending external to the fiber enclosure to be wound substantially within a footprint of the fiber enclosure.

9. A fiber drop access point comprising:
a vault; and
a fiber enclosure positioned within the vault, wherein:
the vault defines a vault volume sized to receive the fiber enclosure;
the fiber enclosure comprises an upper body portion and a lower body portion coupled to the upper body portion;
the upper body portion defines a primary volume;
the lower body portion extends from the upper body portion and defines an inlet volume in communication with the primary volume, the lower body portion comprising a port wall comprising a plurality of ports; and
the port wall is recessed from an outer edge of the upper body portion, such that the plurality of ports is positioned in a separate plane from the upper body portion and recessed from the outer edge of the upper body portion a distance larger than or equal to a bend radius of a cable connected thereto; and
an inlet lateral channel, an outlet lateral channel, and one or more drop fiber channels in communication with the vault, an express fiber cable, and one or more drop fiber cables, wherein:
the plurality of ports comprises a plurality of drop cable ports and an express fiber cable port;
the express fiber cable, positioned within the inlet lateral channel, extends into the vault volume where the express fiber cable enters the fiber enclosure at the express fiber cable port, exits the fiber enclosure, and extends into the outlet lateral channel;
the one or more drop fiber cables extends from one or more drop cable ports of the plurality of drop cable ports through the one or more drop fiber channels; and
a slack of the express fiber cable and the one or more drop fiber cables are wound substantially within a footprint of the fiber enclosure.

10. The fiber drop access point of claim 9, wherein the vault comprises a circular cross-section that substantially corresponds to a dimension of the upper body portion of the fiber enclosure.

11. The fiber drop access point of claim 9, further comprising a double external cable assembly module and sealing grommet assembly positioned within the express fiber cable port, wherein the express fiber cable enters and exits the fiber enclosure through the double external cable assembly module and sealing grommet assembly, the express fiber cable crosses itself at a position proximate the double external cable assembly module and sealing grommet assembly and is held in the position via an anchor extending from the double external cable assembly module and sealing grommet assembly.

12. The fiber drop access point of claim 9, wherein the fiber enclosure further comprises a standoff tray mounted to the upper body portion within the primary volume.

13. The fiber drop access point of claim 12, wherein the fiber enclosure further comprises a splice tray mounted to the standoff tray, wherein:

the standoff tray comprises one or more tray retention tabs, the one or more tray retention tabs extending through the splice tray such that a position of the splice tray is retained within the primary volume.

14. The fiber drop access point of claim 9, wherein the fiber enclosure further comprises a splice tray mounted to the upper body portion within the primary volume, wherein:

the outer edge of the upper body portion defines a clip port;

the splice tray comprises a clip comprising a tab; and the clip is receivable within the clip port to hold the splice tray in an upright position when the splice tray is moved from the primary volume.

15. The fiber drop access point of claim 9, wherein the fiber enclosure further comprises a lid and a plurality of clamps configured to secure the lid to the upper body portion.

16. The fiber drop access point of claim 9, wherein:

the plurality of ports comprises a plurality of drop cable ports and an express fiber cable port; and the plurality of drop cable ports is positioned substantially in line with the express fiber cable port such that a common plane extends through the plurality of drop cable ports and the express fiber cable port.

17. The fiber drop access point of claim 11, wherein the express fiber cable port is sized to receive a double external cable assembly module and sealing grommet assembly.

18. The fiber drop access point of claim 9, wherein the upper body portion comprises a substantially octagonal shape.

* * * * *